US012783112B2

(12) United States Patent
O'Hern et al.

(10) Patent No.: US 12,783,112 B2
(45) Date of Patent: Nov. 3, 2026

(54) COMPACT NODE GRAPHS

(71) Applicant: Apple Inc., Cupertino, CA (US)

(72) Inventors: Adam M. O'Hern, Campbell, CA (US); Christian D. McCartney, Austin, TX (US); Geoffroy Audy, Fremont, CA (US); Reza Shirazian, Berkeley, CA (US); Zikang Li, Mountain View, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 19/206,947

(22) Filed: May 13, 2025

(65) Prior Publication Data

US 2025/0377772 A1 Dec. 11, 2025

Related U.S. Application Data

(60) Provisional application No. 63/657,556, filed on Jun. 7, 2024.

(51) Int. Cl.

| | |
|---|---|
| ***G06F 3/04842*** | (2022.01) |
| ***G06F 3/0481*** | (2022.01) |
| ***G06T 3/40*** | (2006.01) |
| ***G06T 11/26*** | (2026.01) |

(52) U.S. Cl.

CPC ........ *G06F 3/04842* (2013.01); *G06F 3/0481* (2013.01); *G06T 3/40* (2013.01); *G06T 11/26* (2026.01); *G06T 2200/24* (2013.01)

(58) Field of Classification Search

CPC ........................................................ G06F 16/26

See application file for complete search history.

(56) References Cited

U.S. PATENT DOCUMENTS

| | | | | |
|---|---|---|---|---|
| 2002/0122047 A1* | 9/2002 | Dewa | G06F 3/0481 345/649 |
| 2004/0019676 A1* | 1/2004 | Iwatsuki | H04L 69/329 709/224 |
| 2013/0232452 A1* | 9/2013 | Krajec | G06F 16/258 715/840 |
| 2015/0212928 A1* | 7/2015 | Gounares | G06F 11/3698 717/125 |
| 2016/0283345 A1* | 9/2016 | Gounares | G06F 11/3636 |
| 2021/0319603 A1* | 10/2021 | Gilbertson | G06T 11/206 |
| 2022/0116423 A1* | 4/2022 | Cummins | H04L 63/20 |

* cited by examiner

*Primary Examiner* — Nan-Ying Yang

(74) *Attorney, Agent, or Firm* — Fernando & Partners, LLP

(57) ABSTRACT

In one implementation, a method of generating a node graph is performed at a device including a display, one or more processors, and non-transitory memory. The method includes displaying, on the display, a plurality of nodes associated with a respective plurality of operations. The method includes displaying a node group representation including a boundary surrounding a node group including a subset of the plurality of nodes. The method includes, in response to a determination that at least one node excluded from the node group is inside the boundary, displaying each of the subset of the plurality of nodes of the node group in a first manner and displaying the at least one node excluded from the node group in a second manner different than the first manner.

19 Claims, 30 Drawing Sheets

300

COMPACT NODE GRAPHS

CROSS-REFERENCE TO RELATED APPLICATIONS

This application claims priority to U.S. Provisional Patent App. No. 63/657,556, filed on Jun. 7, 2024, which is hereby incorporated by reference in its entirety.

TECHNICAL FIELD

The present disclosure generally relates to a user interface for presenting a node graph.

BACKGROUND

In various applications, a node graph can be generated to define output values. For example, the output value may be the color of a point on a surface of a virtual object based on the location of the point on the surface. As a node graph may include a large number of nodes, it may be difficult to visualize the entire node graph or obtain a complete understanding of the node graph to be able to make meaningful modifications.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
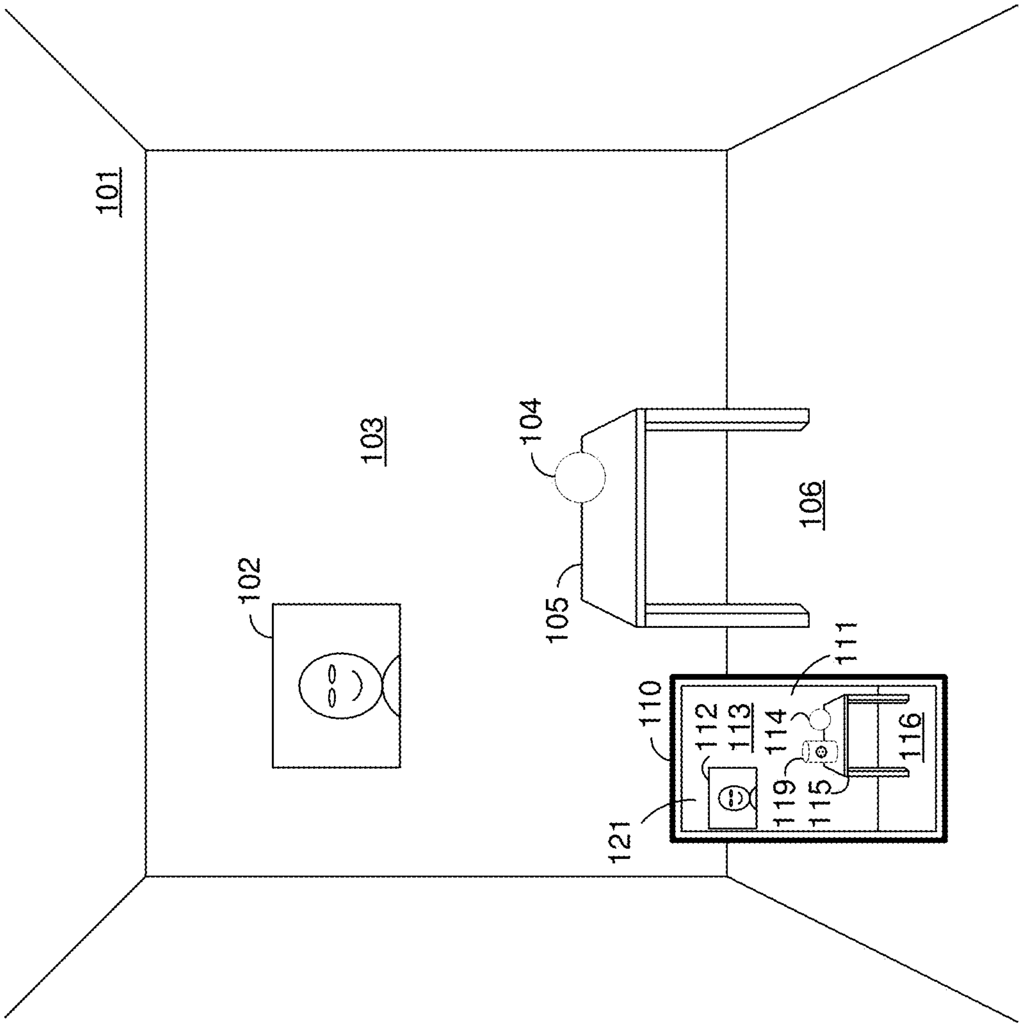
FIG. 1 illustrates a physical setting with an electronic device surveying the physical setting.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying a node graph including a node group representation. In various implementations, the method is performed at a device including a display, one or more processors, and non-transitory memory. In various implementations, the method includes displaying, on the display, a plurality of nodes associated with a respective plurality of operations. The method includes displaying a node group representation including a boundary surrounding a node group including a subset of the plurality of nodes. The method includes, in response to a determination that at least one node excluded from the node group is inside the boundary, displaying each of the subset of the plurality of nodes of the node group in a first manner and displaying the at least one node excluded from the node group in a second manner different than the first manner.

Various implementations disclosed herein include devices, systems, and methods for displaying a node graph at different zoom levels. In various implementations, the method is performed at a device including a display, one or more processors, and non-transitory memory. In various implementations, the method includes displaying, on the display, a plurality of nodes associated with a respective plurality of operations, wherein a particular node of the plurality of nodes is displayed with a first size and a first representation. The method includes detecting a first user input changing a level of zoom from a first zoom level to a second zoom level. The method includes in response to detecting the first user input, displaying the particular node with a second size different than the first size and a second representation different than the first representation.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

Description

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 illustrates a physical environment 101 with an electronic device 110 surveying the physical environment 101. The physical environment 101 includes a picture 102 hanging on a wall 103, a table 105 on a floor 106, and a ball 104 on the table 105.

The electronic device 110 displays, on a display, an image of an XR environment 121 which includes a representation of the physical environment 111 and a representation of a virtual object 119. In various implementations, the representation of the physical environment 111 is generated based on an image of the physical environment 101 captured with one or more cameras of the electronic device 110 having a field-of-view directed toward the physical environment 101. Suitable cameras include scene cameras, event cameras, depth cameras, and so forth. Accordingly, the representation of the physical environment 111 includes a representation of the picture 112 hanging on a representation of the wall 113, a representation of the table 115 on a representation of the floor 116, and a representation of the ball 114 on the representation of the table 115.

In addition to the representations of real objects of the physical environment 101, the image of the XR environment 121 includes a representation of the virtual object 119. The visual appearance of virtual object 119 is defined by software on the electronic device 110. The electronic device 110 presents virtual object 119 as resting on the top surface of the representation of the table 115 by accounting for the position and orientation of the electronic device 110 relative to table 105.

Figure 2A:
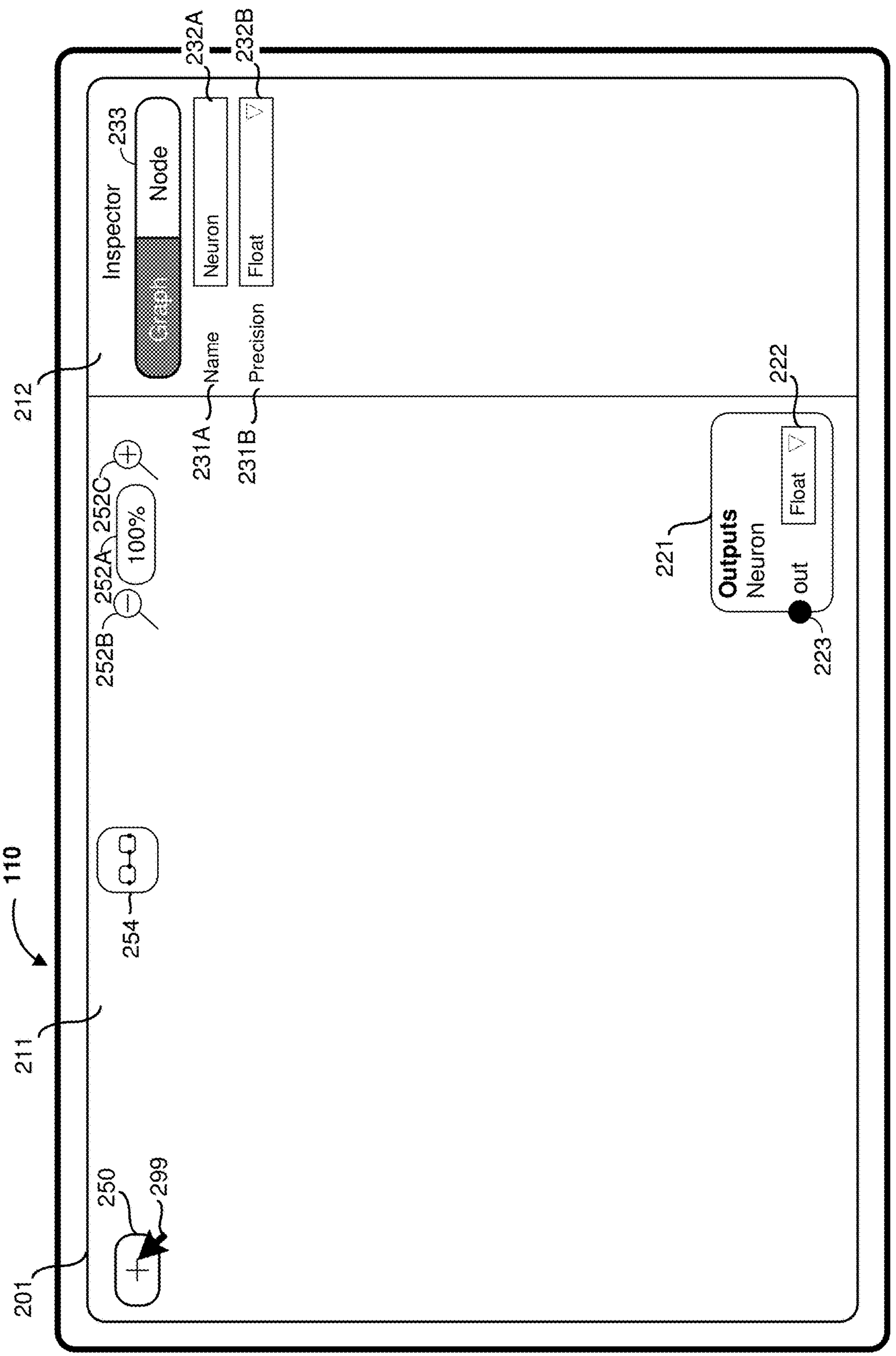
FIGS. 2A-2Z illustrate the electronic device of FIG. 1 displaying a graphical user interface (GUI) for presenting a node graph.
Figure 2B:
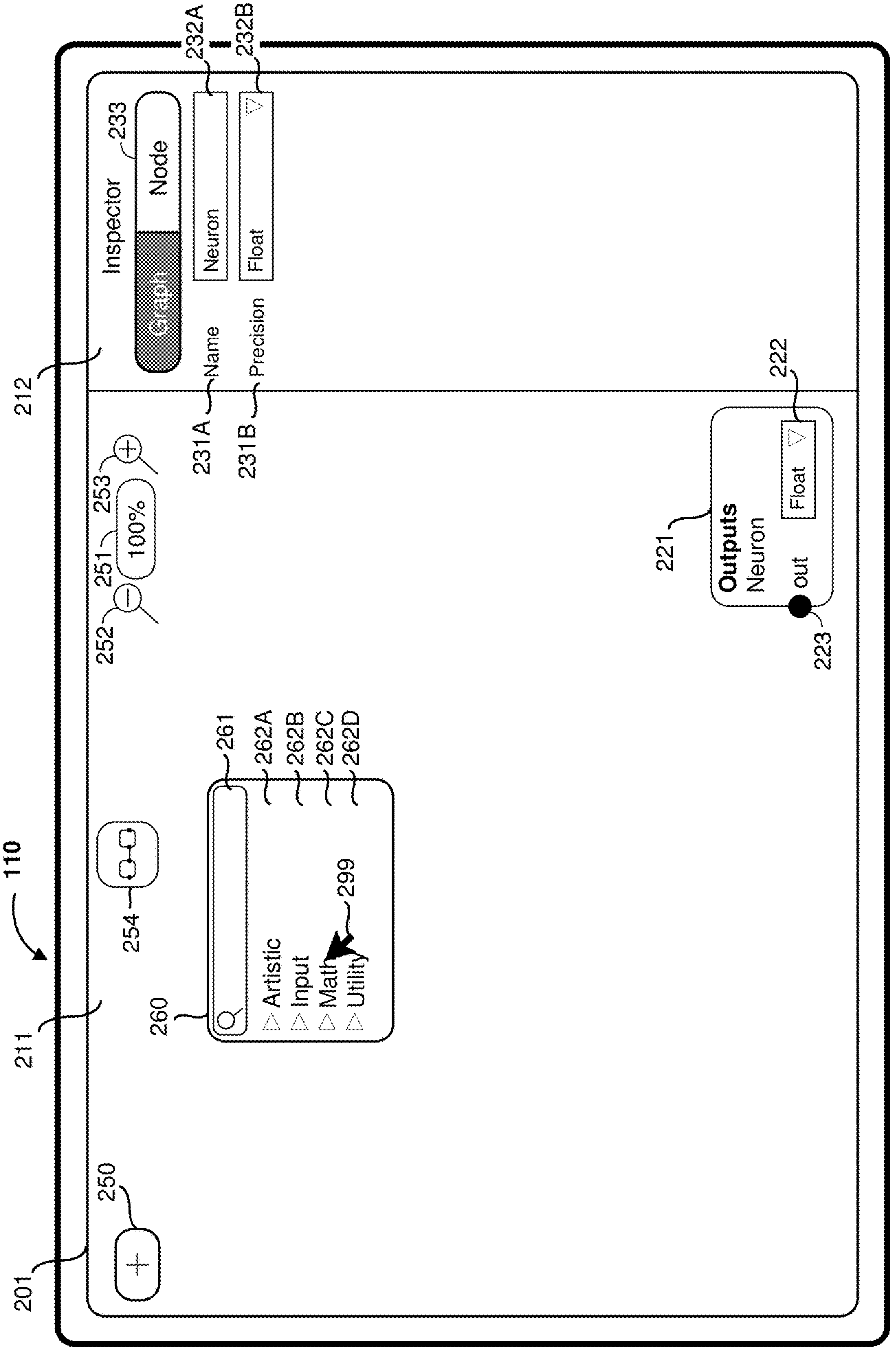
Figure 2C:
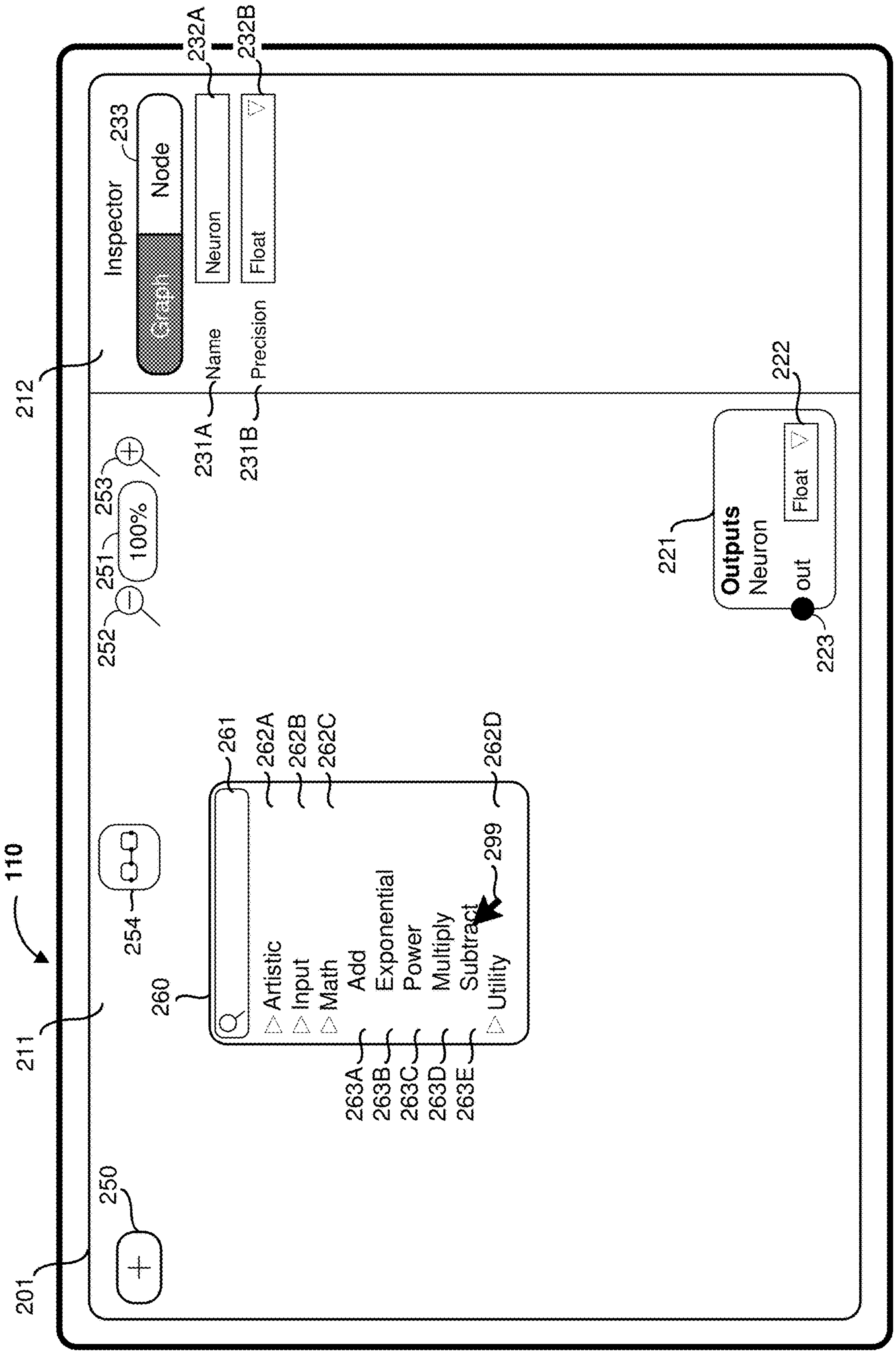
Figure 2D:
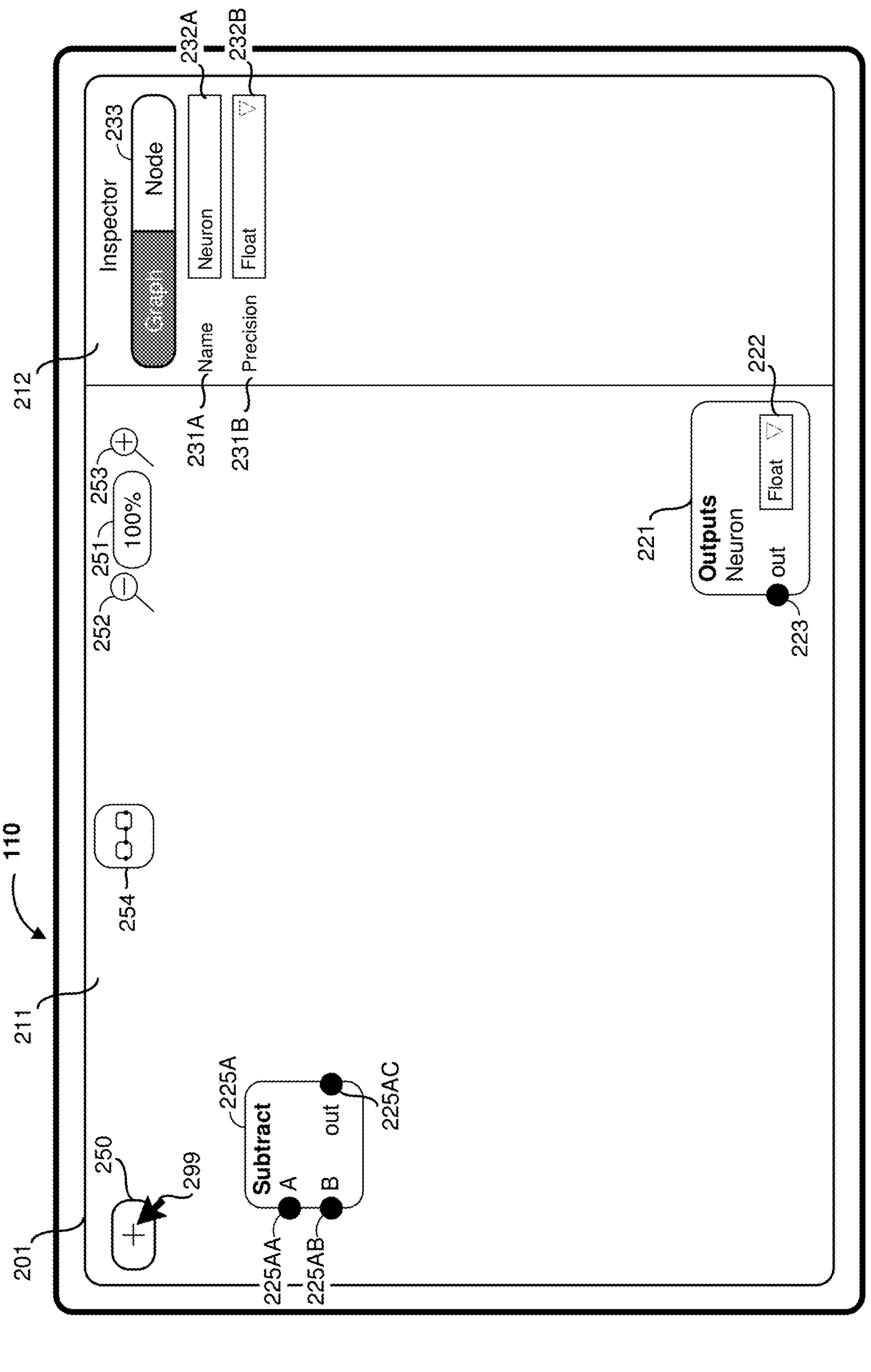
Figure 2E:
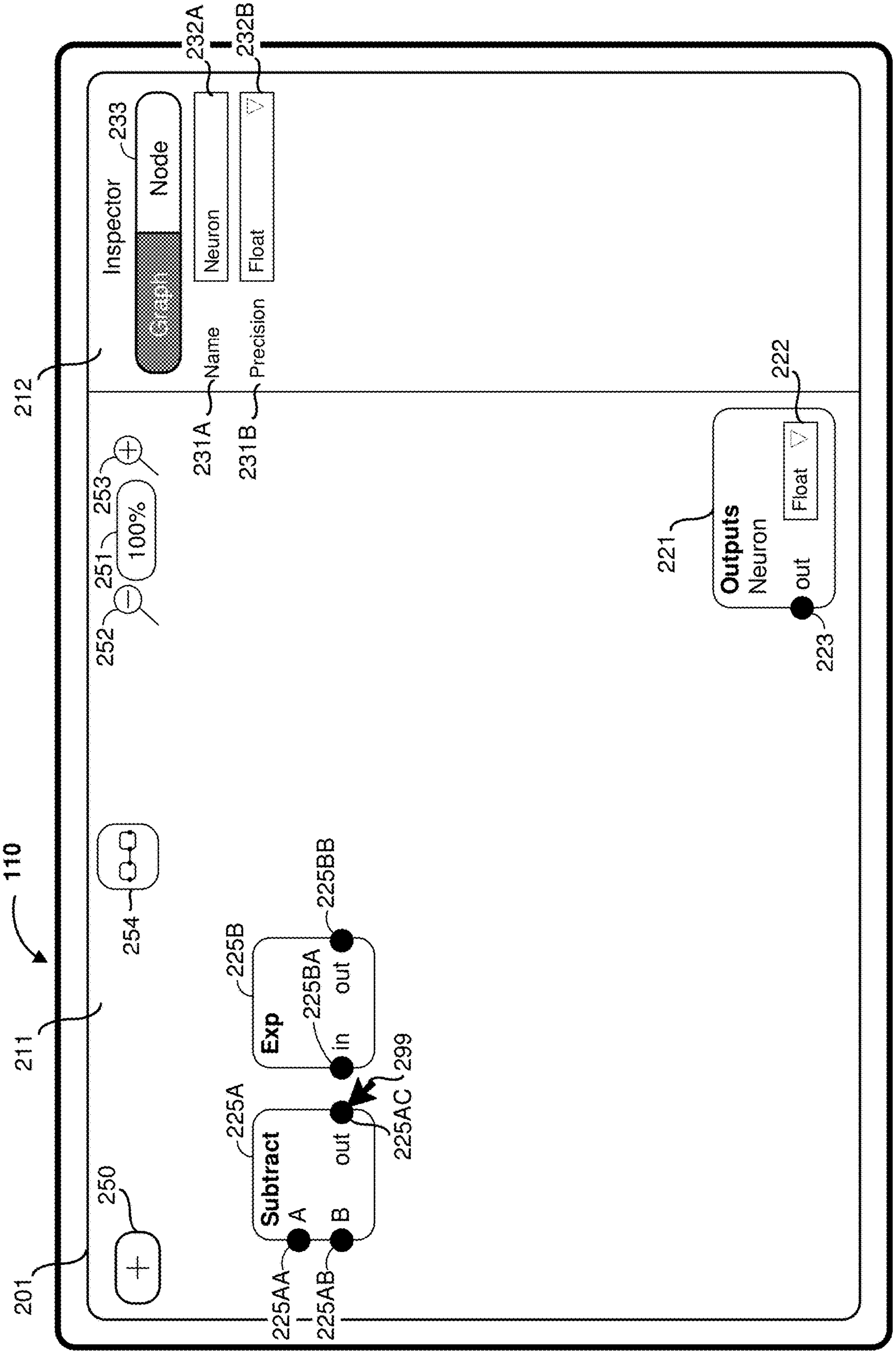
Figure 2F:
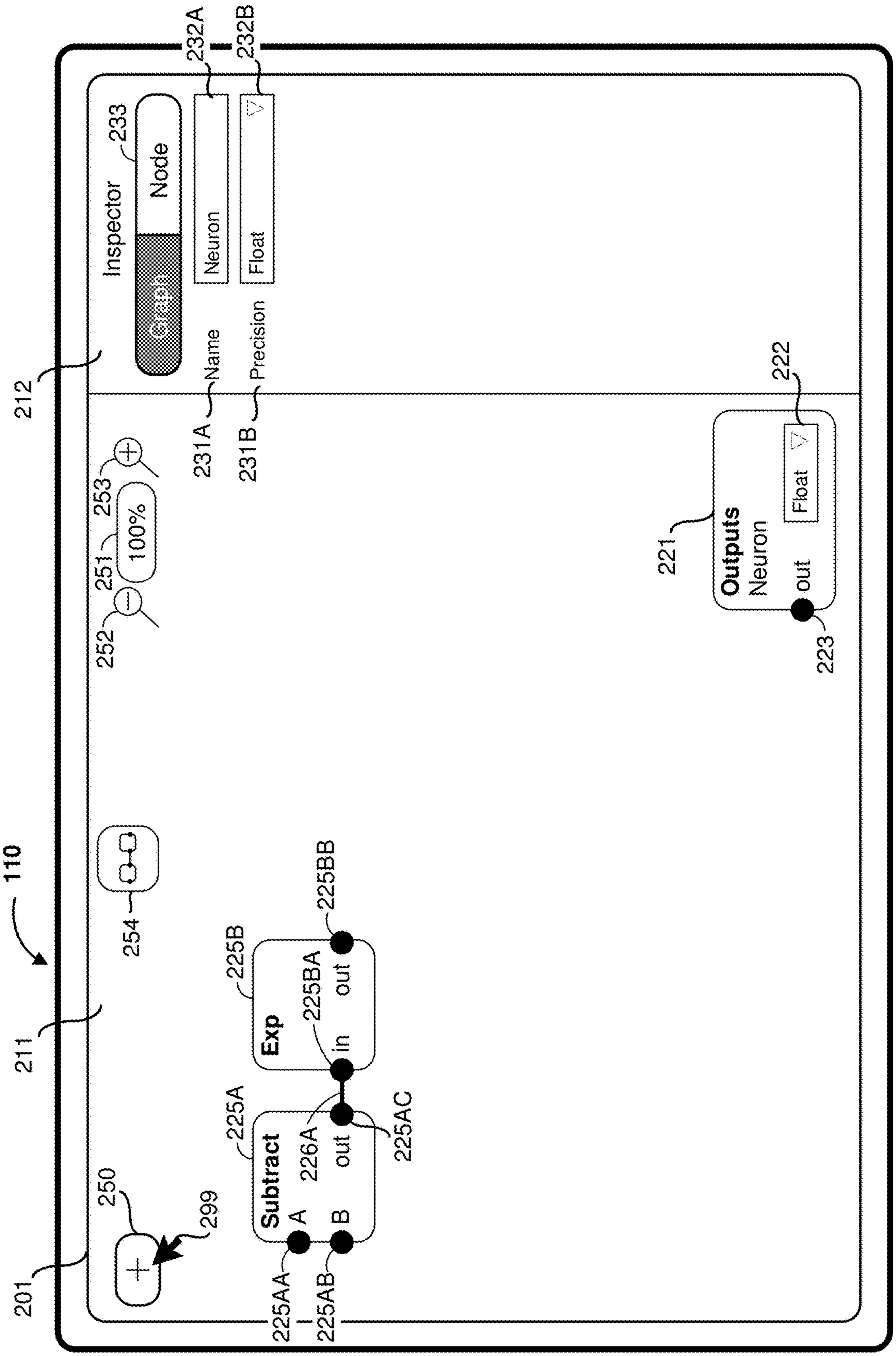
Figure 2G:
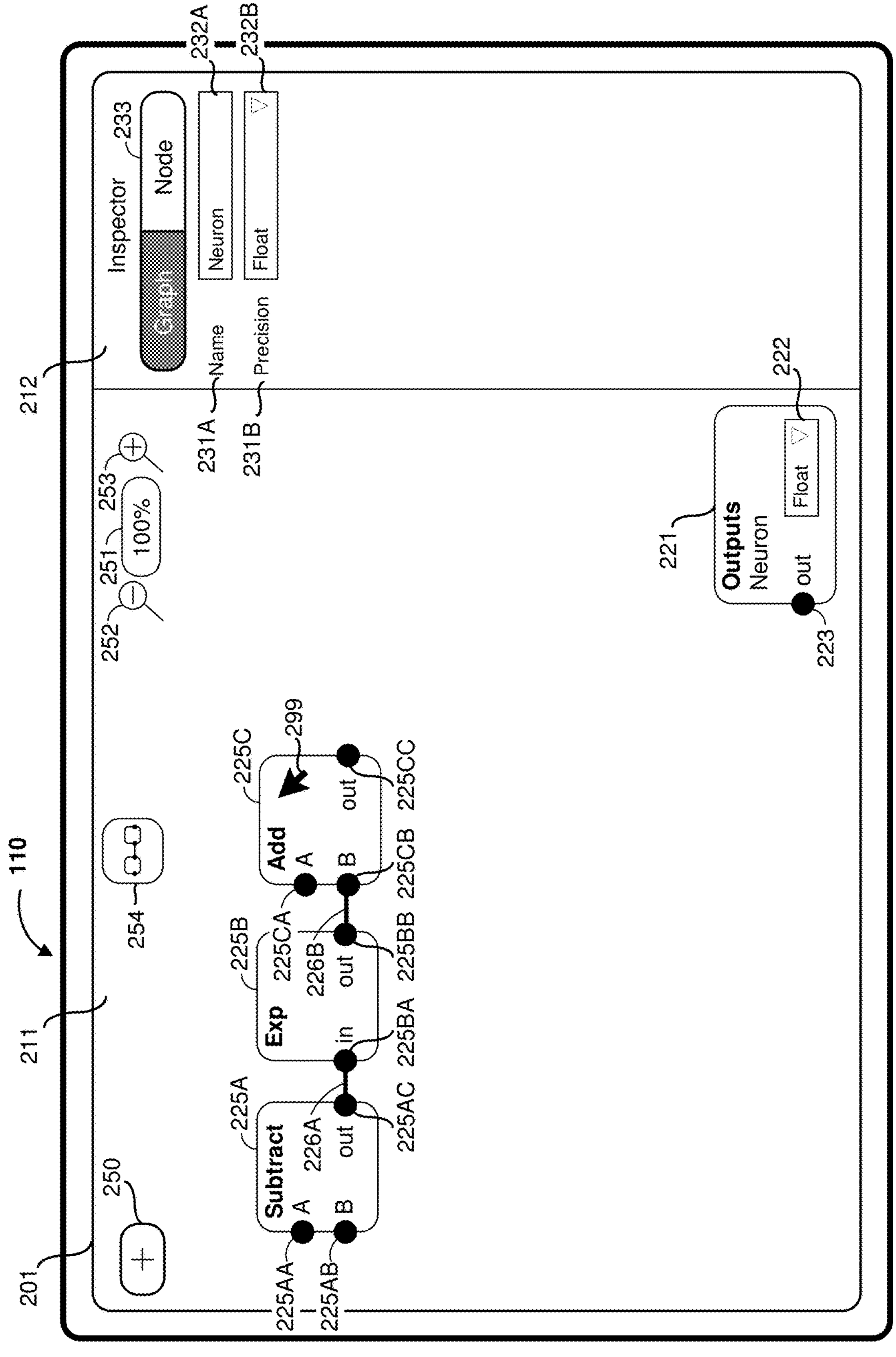
Figure 2H:
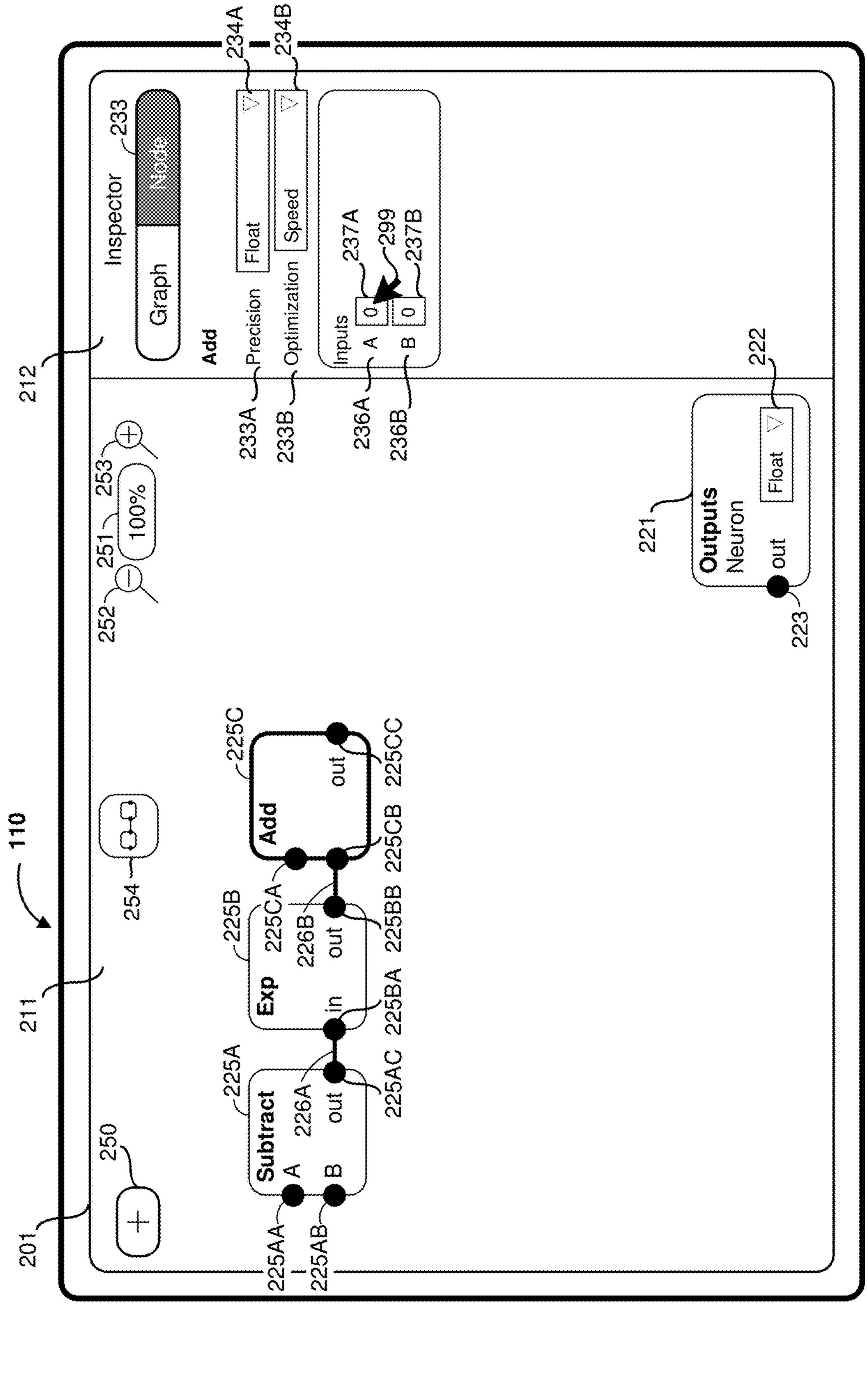
Figure 2I:
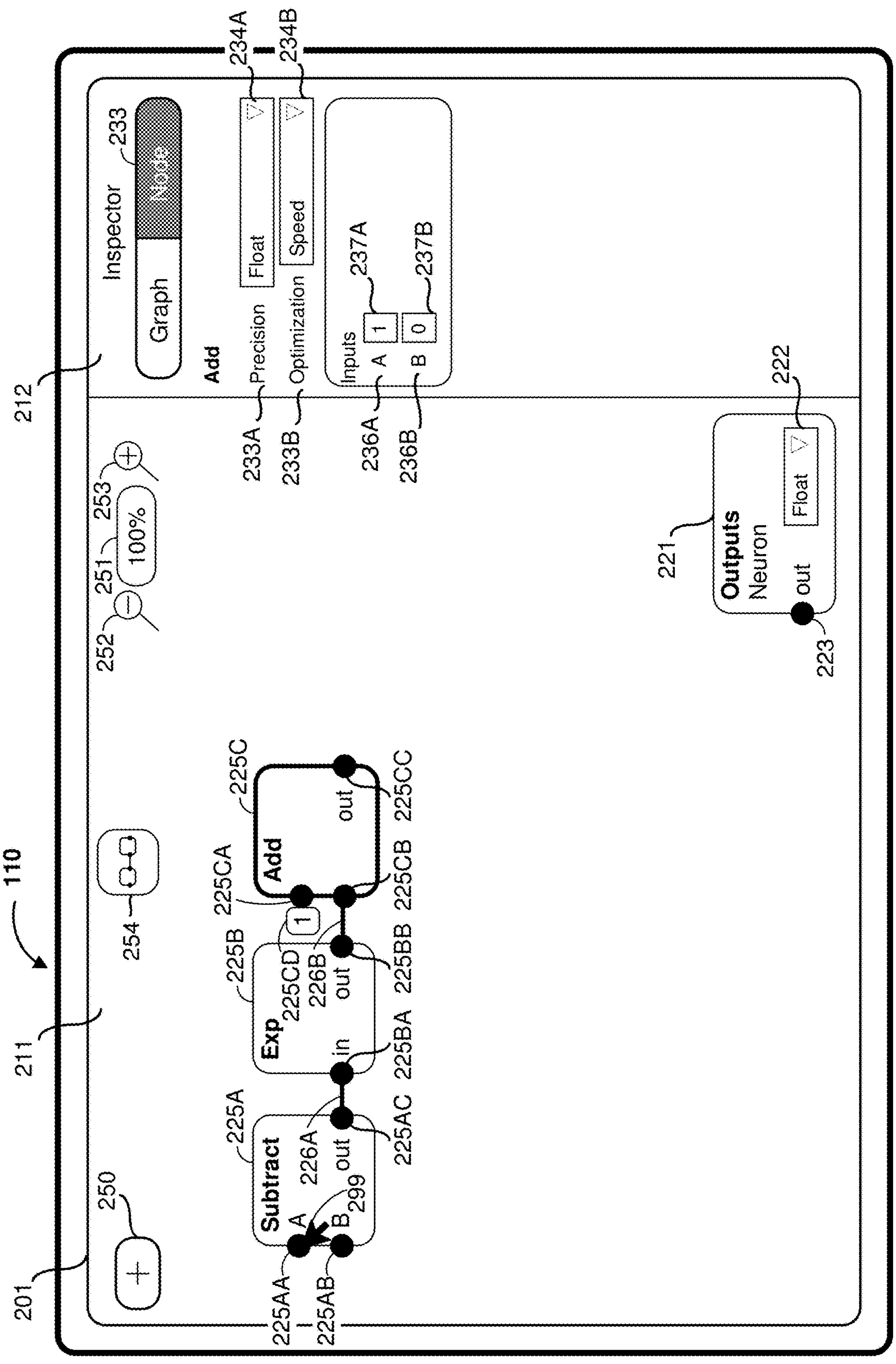
Figure 2J:
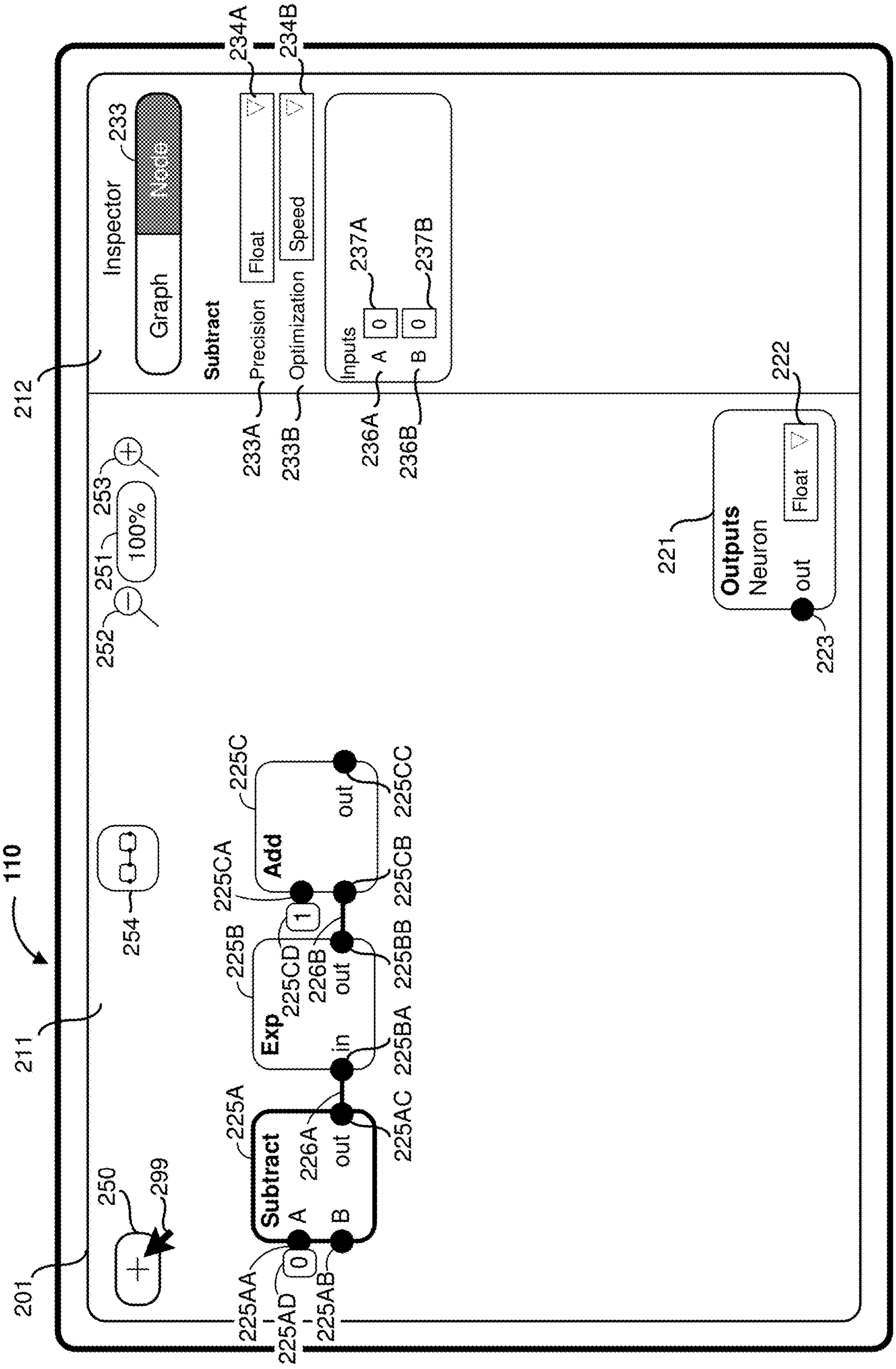
Figure 2K:
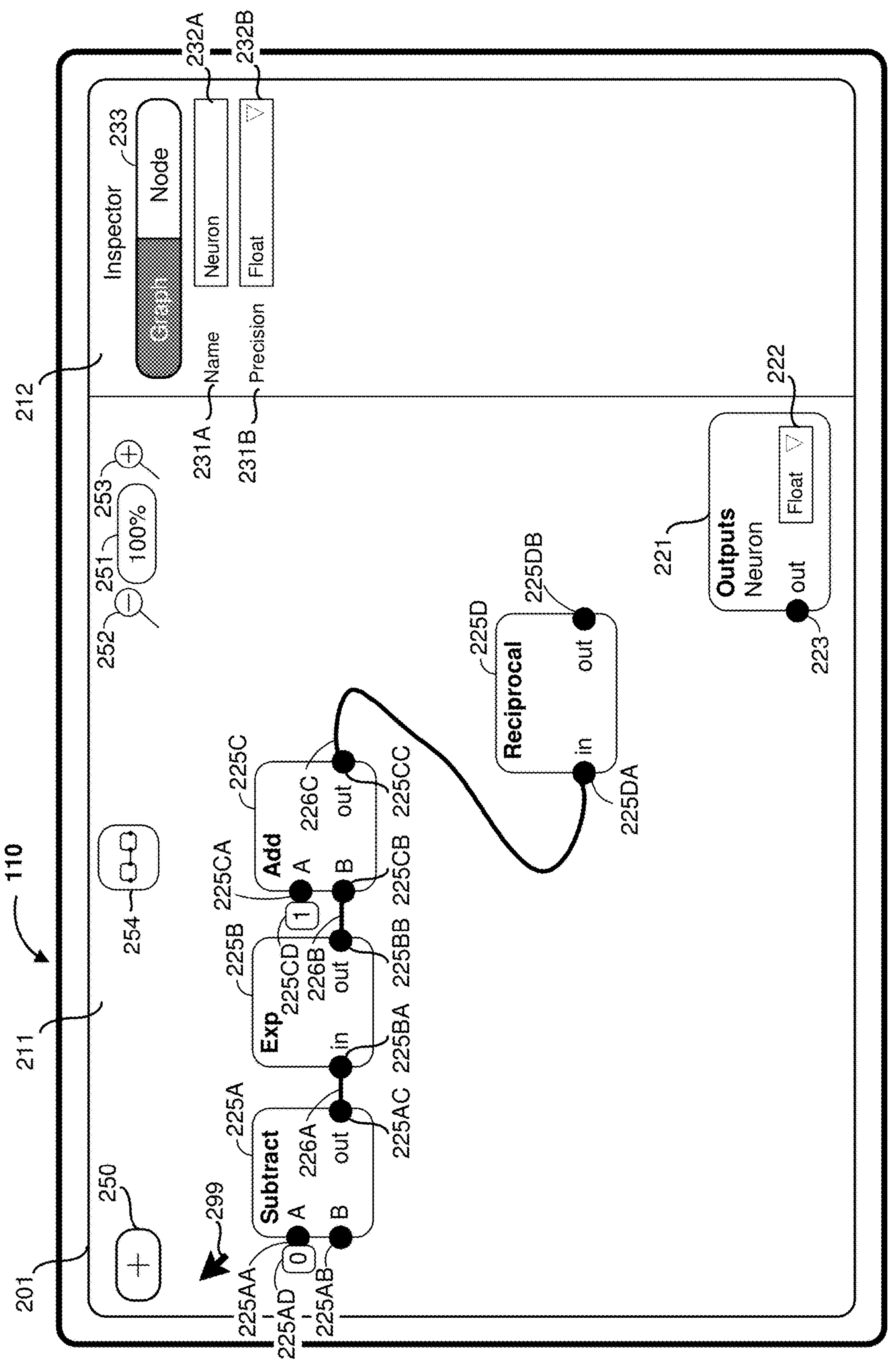
Figure 2L:
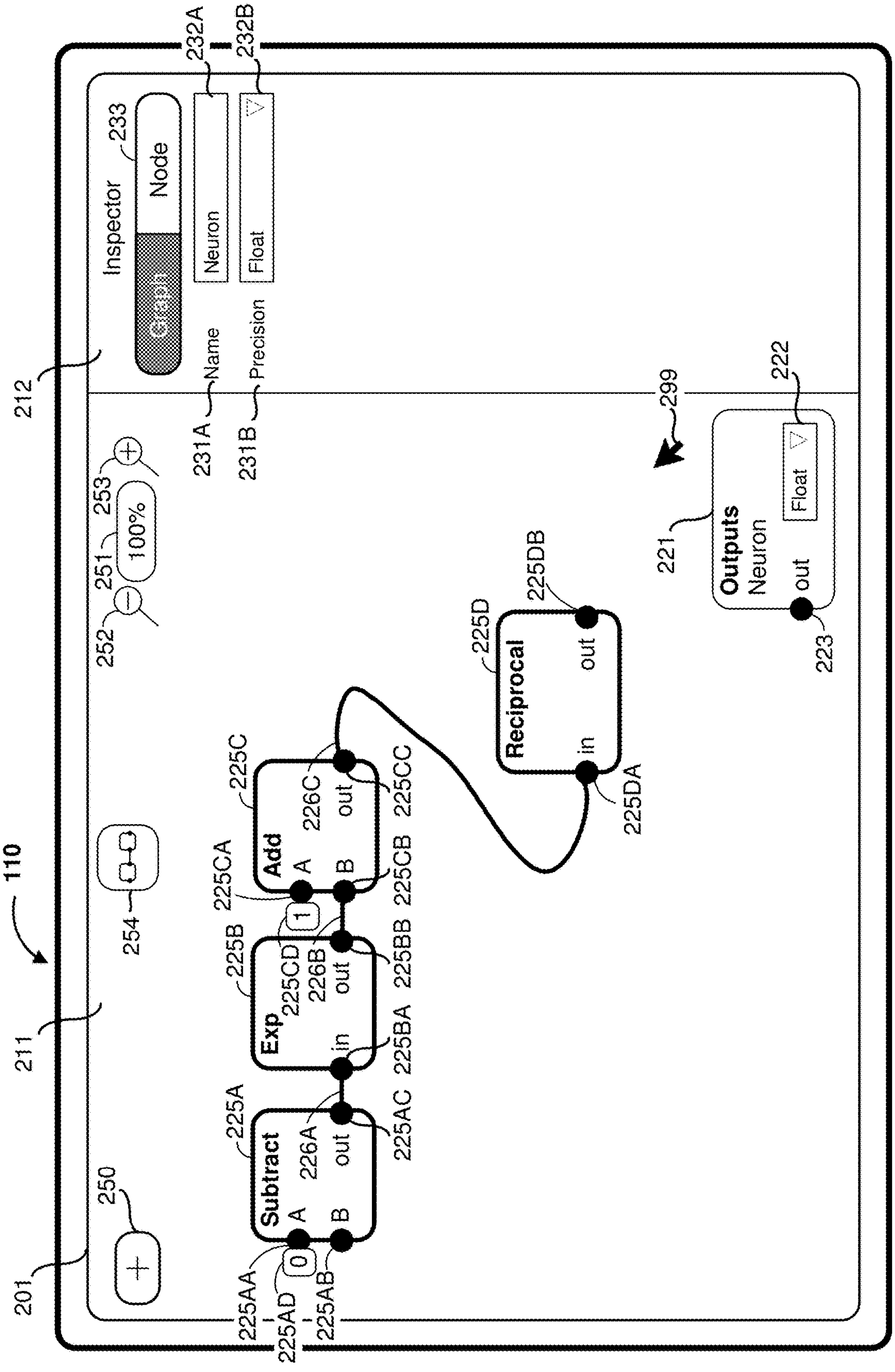
Figure 2M:
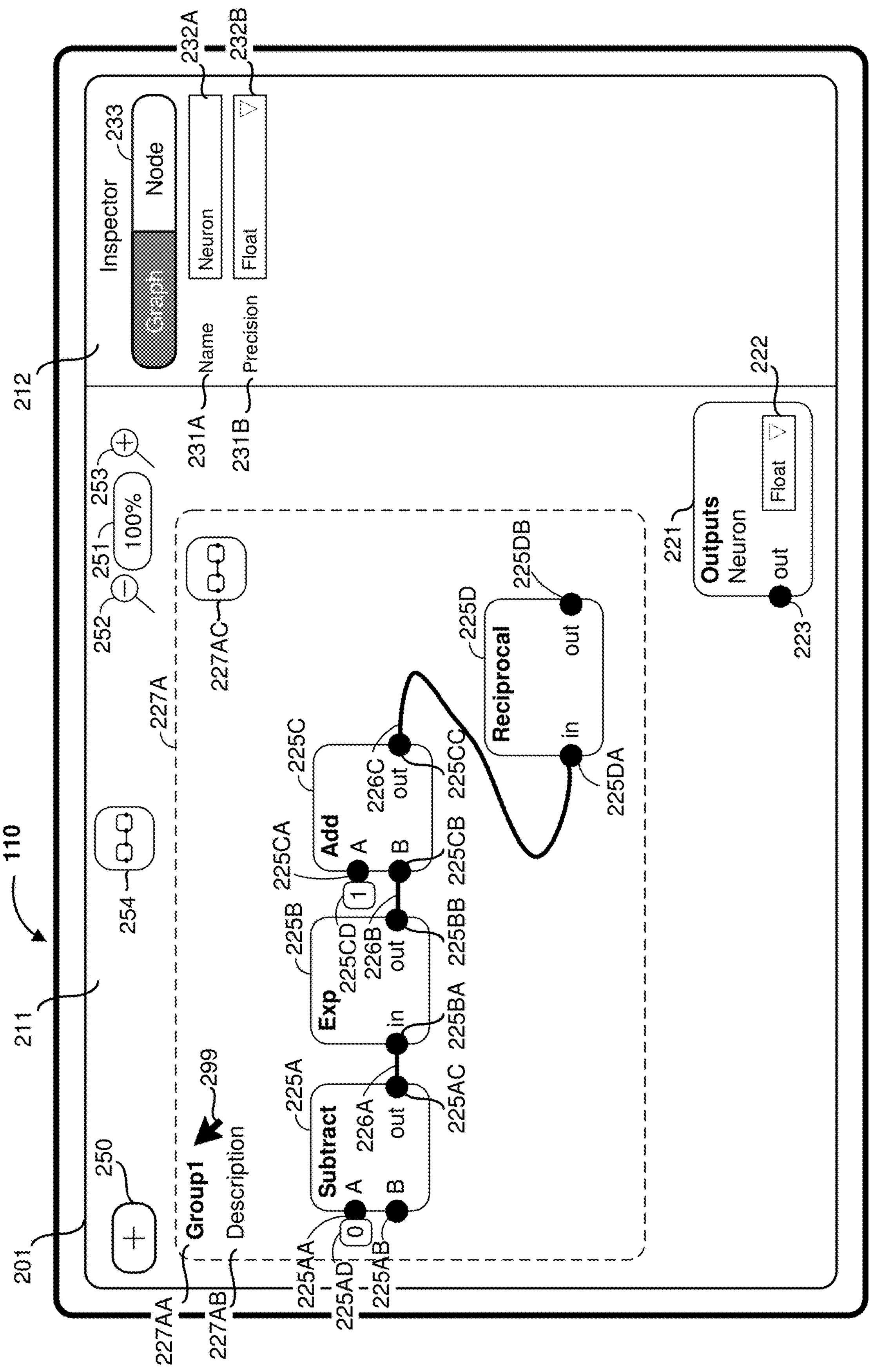
Figure 2N:
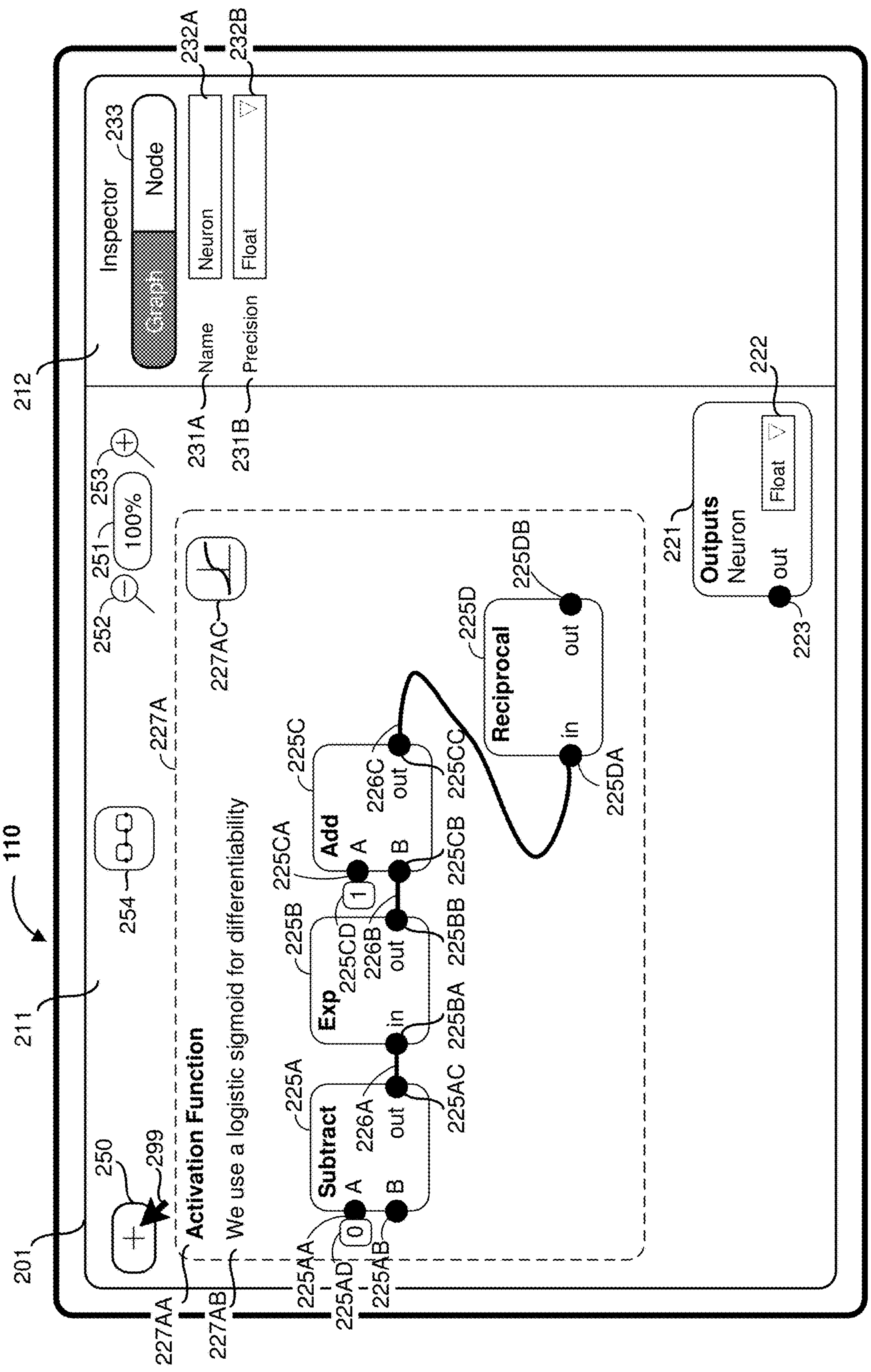
Figure 2O:
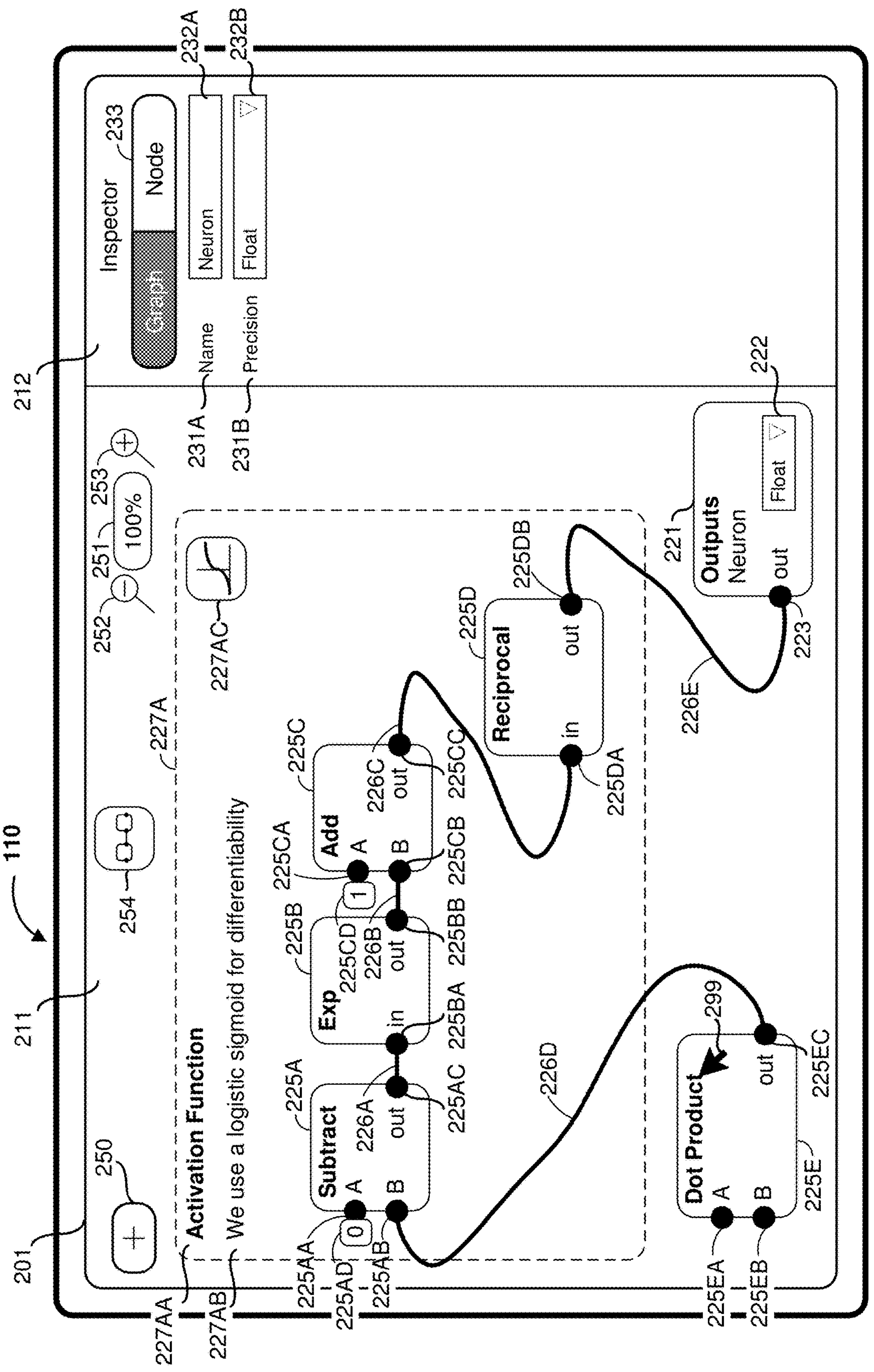
Figure 2P:
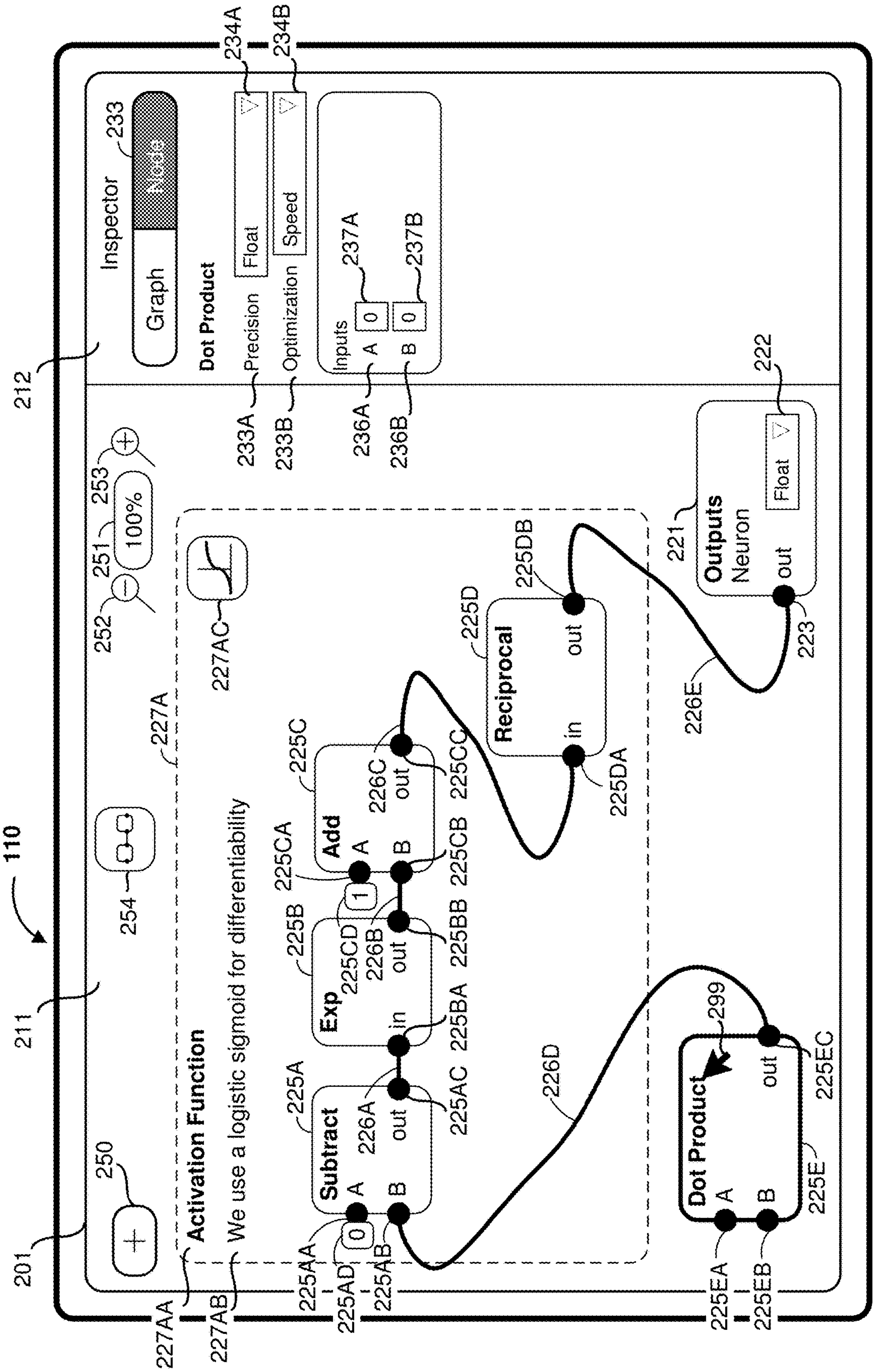
Figure 2Q:
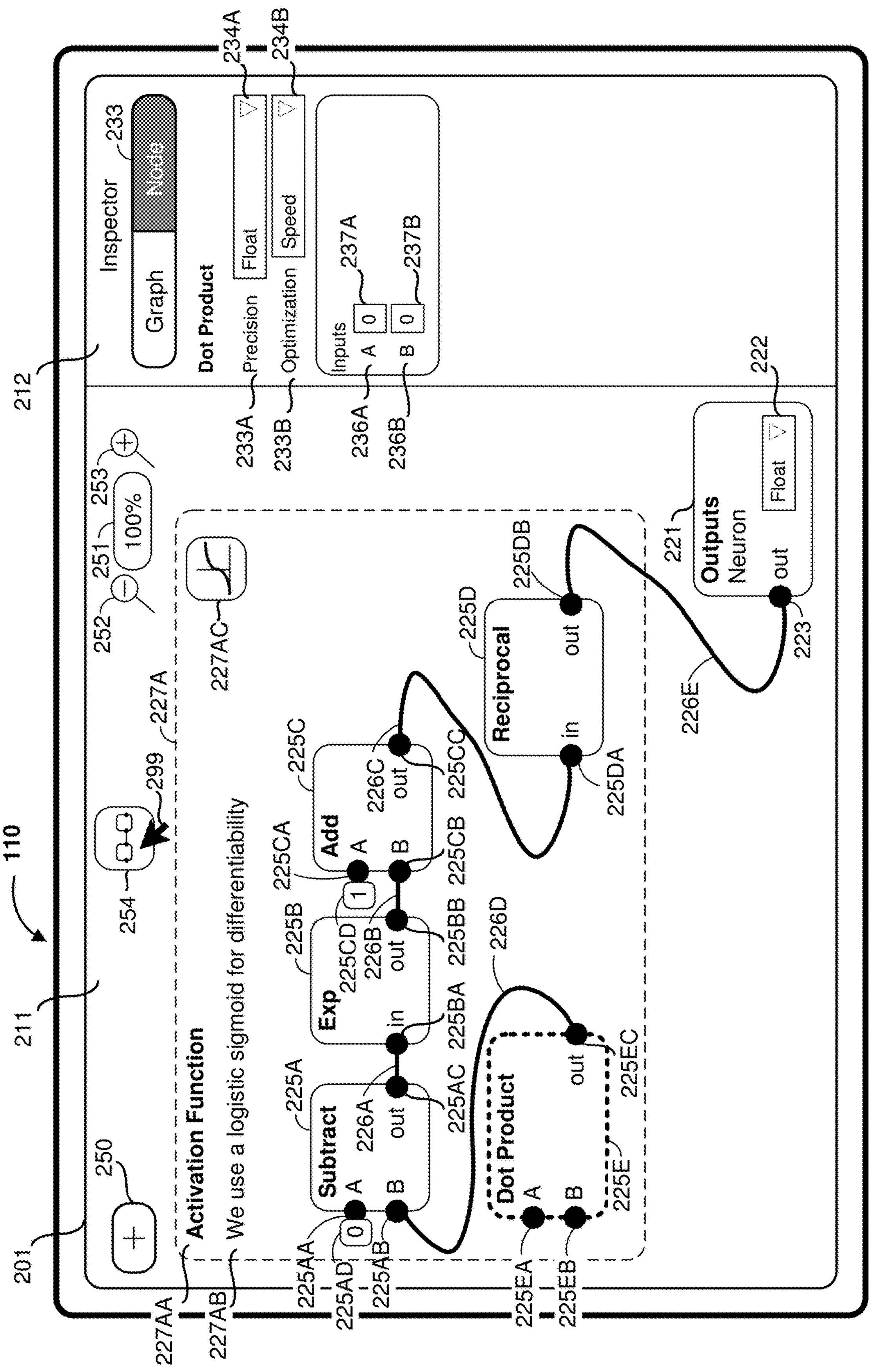
Figure 2R:
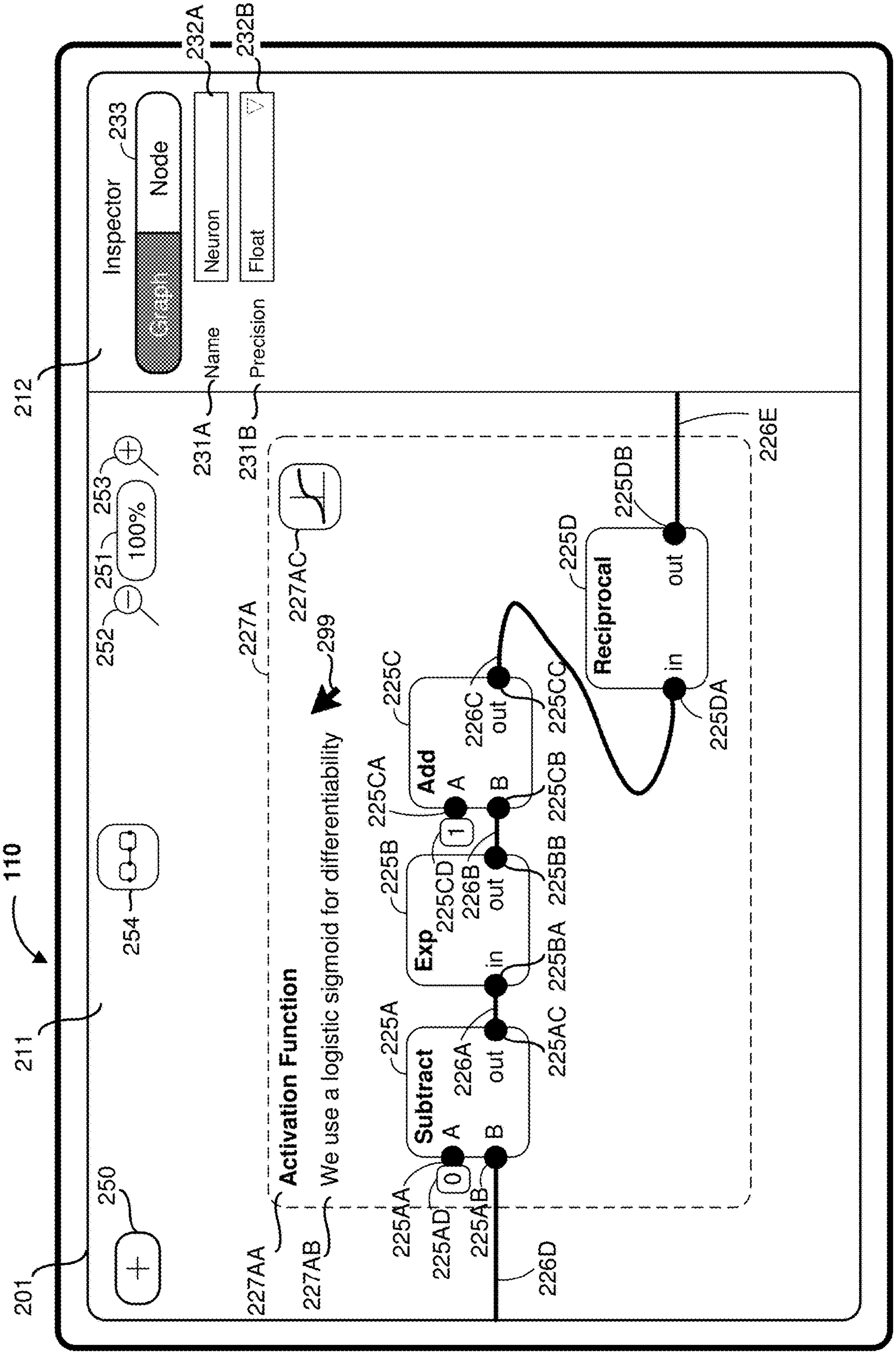
Figure 2S:
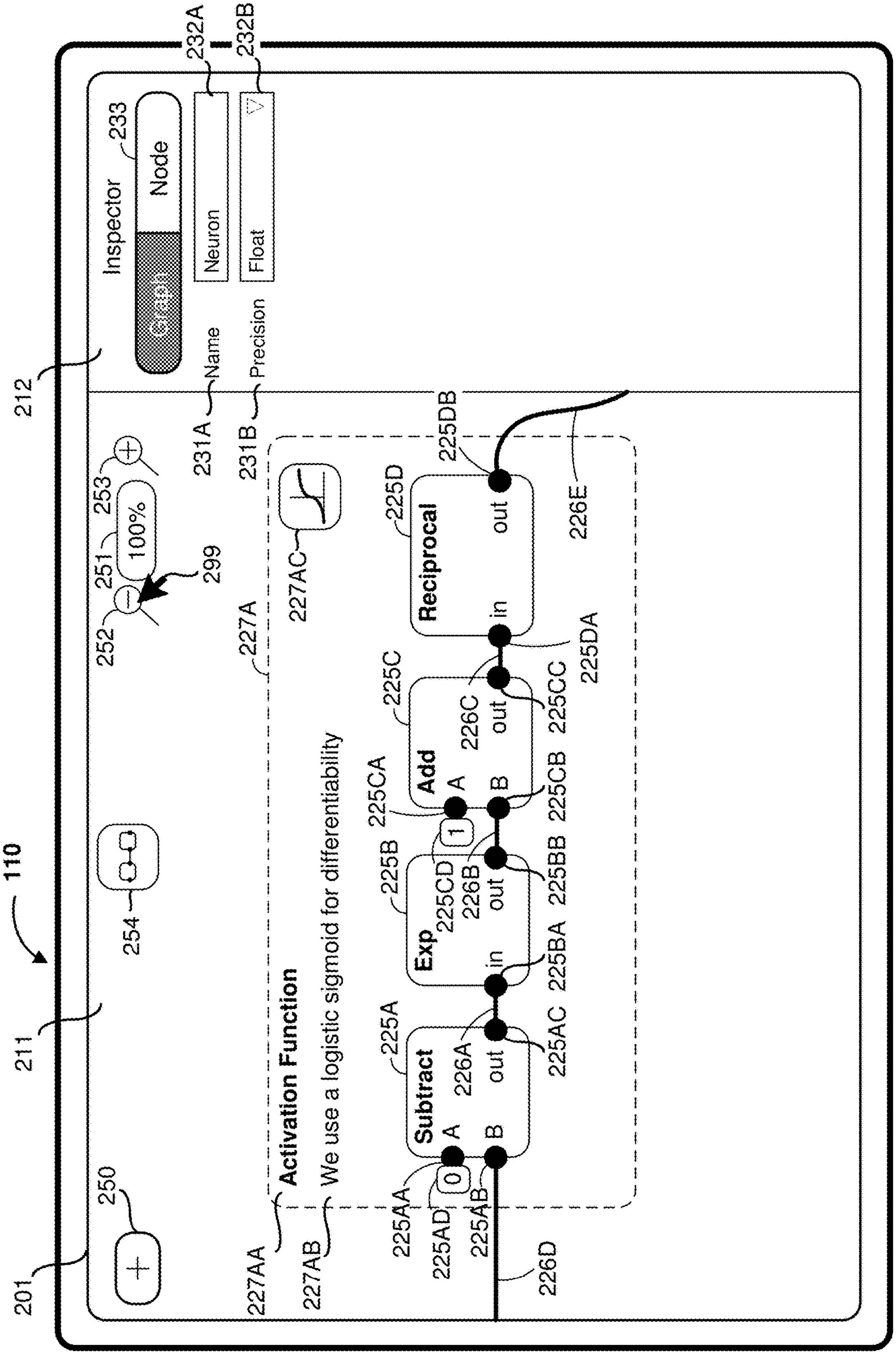
Figure 2T:
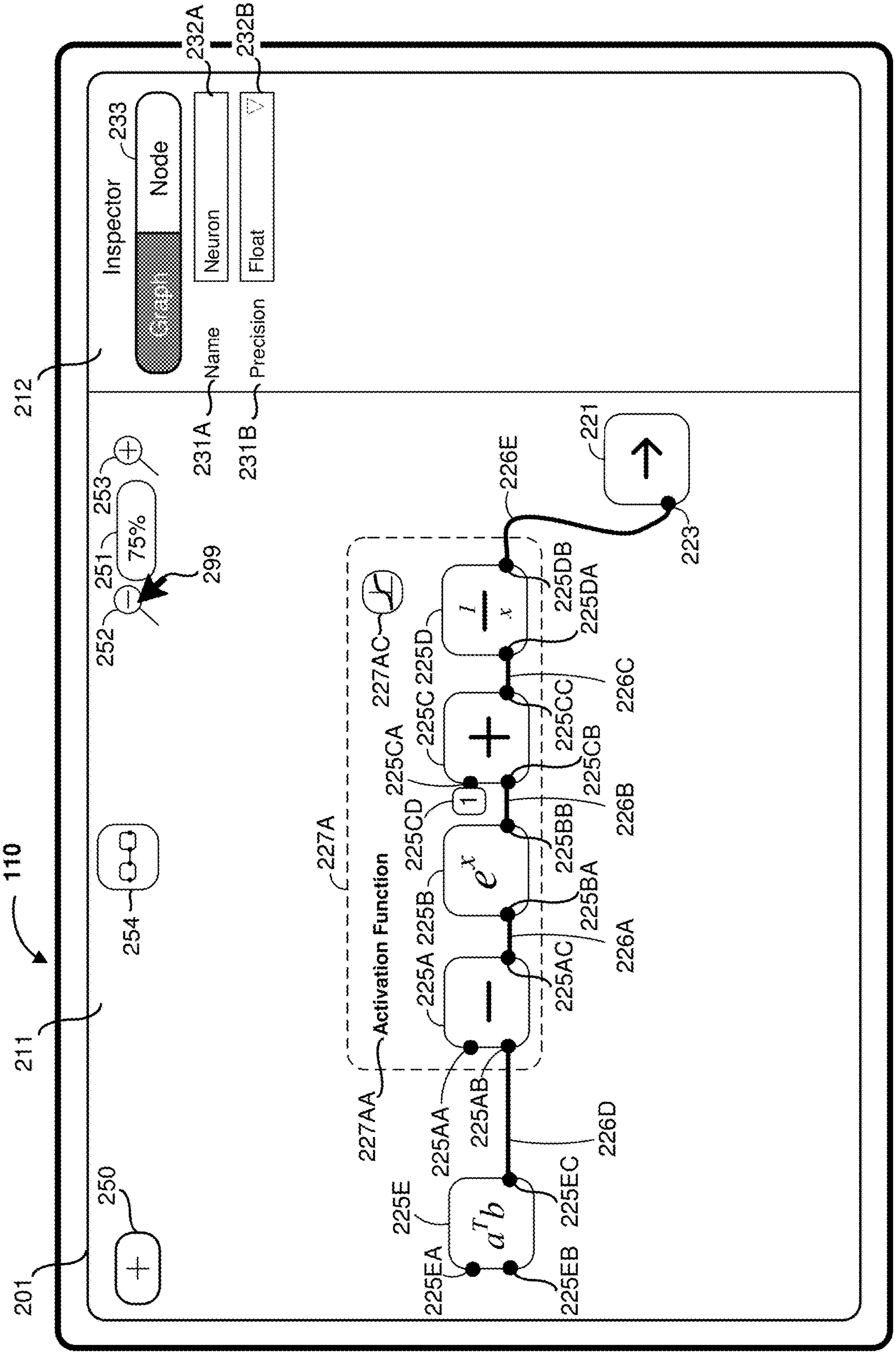
Figure 2U:
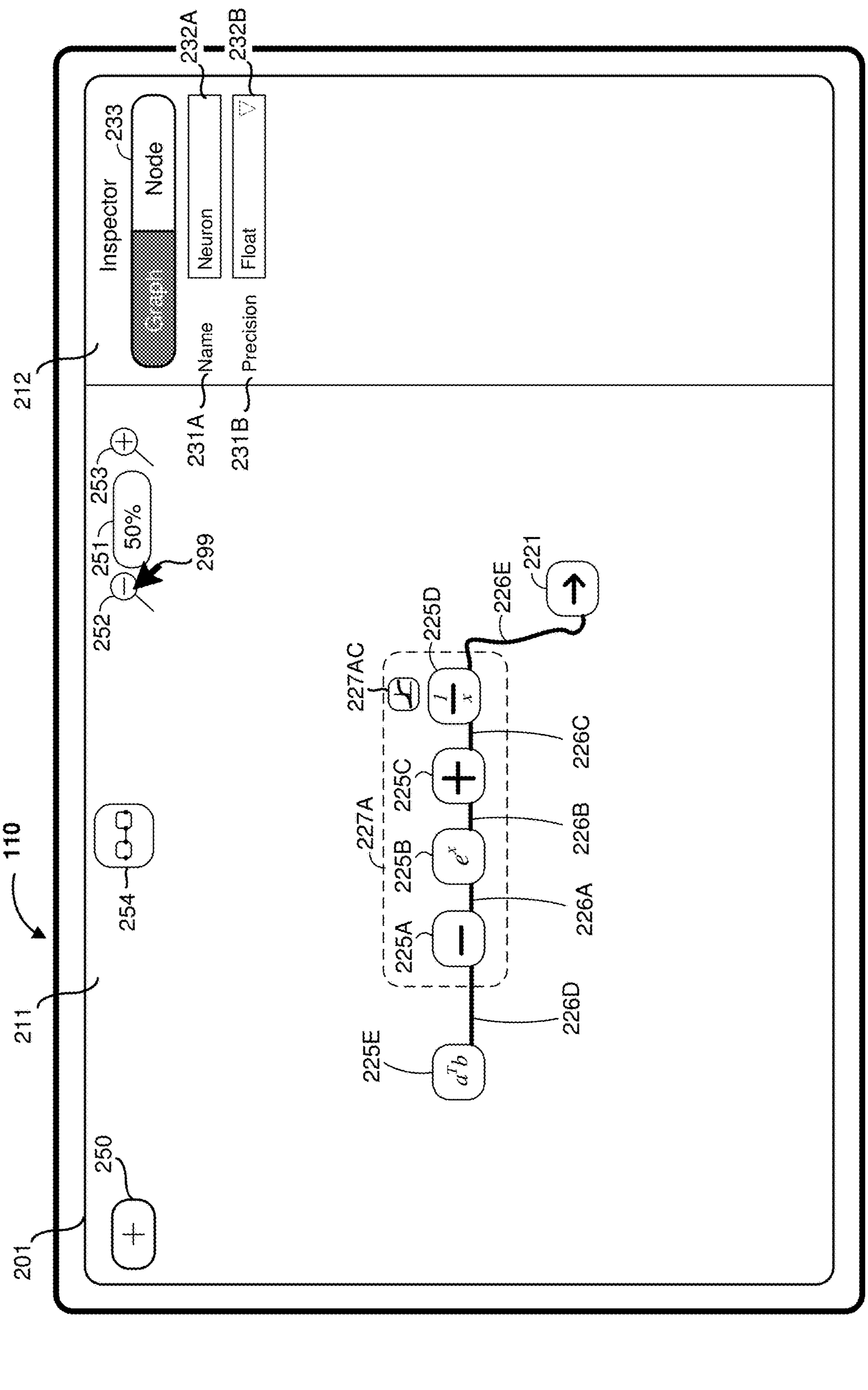
Figure 2V:
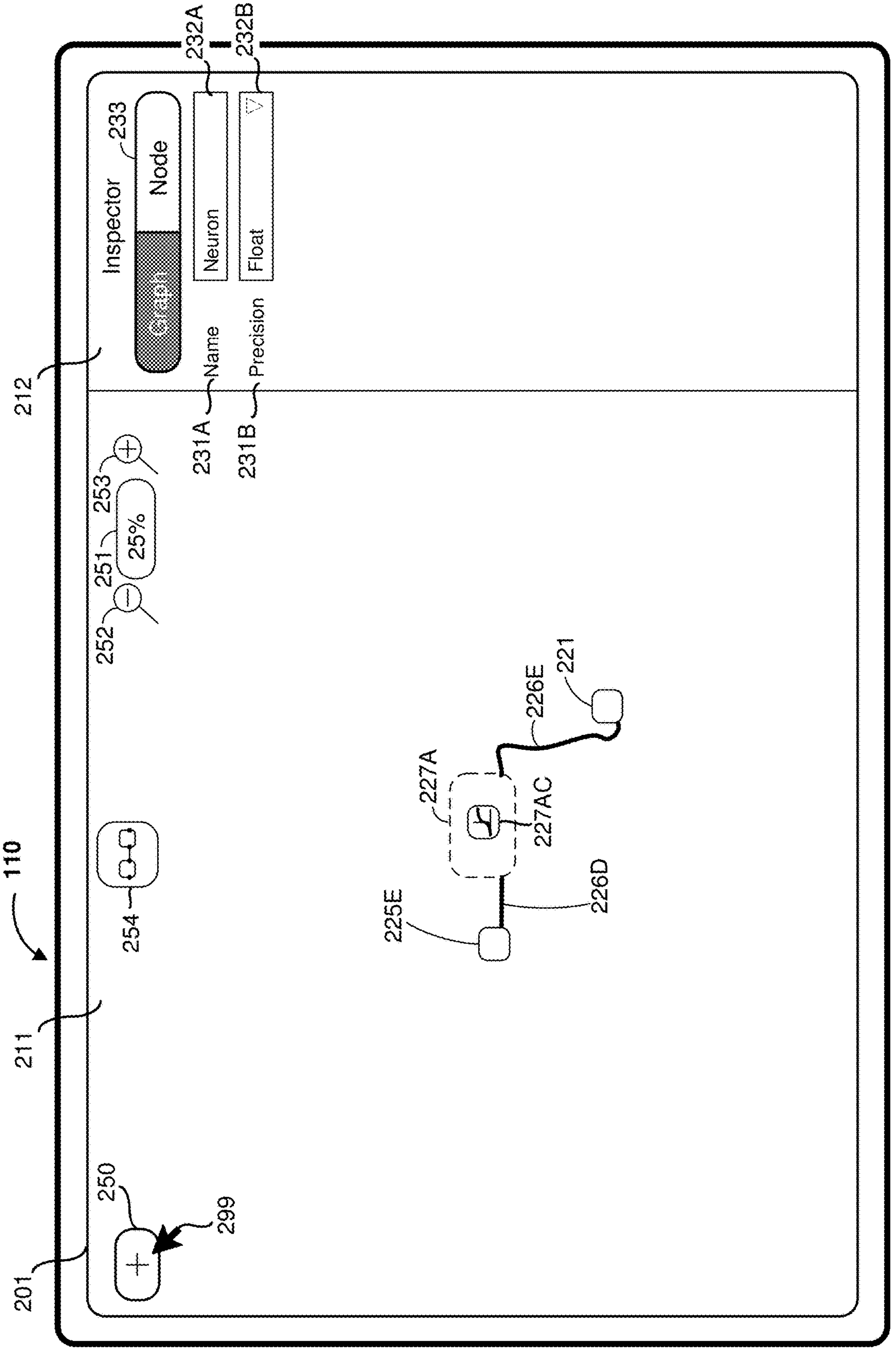
Figure 2W:
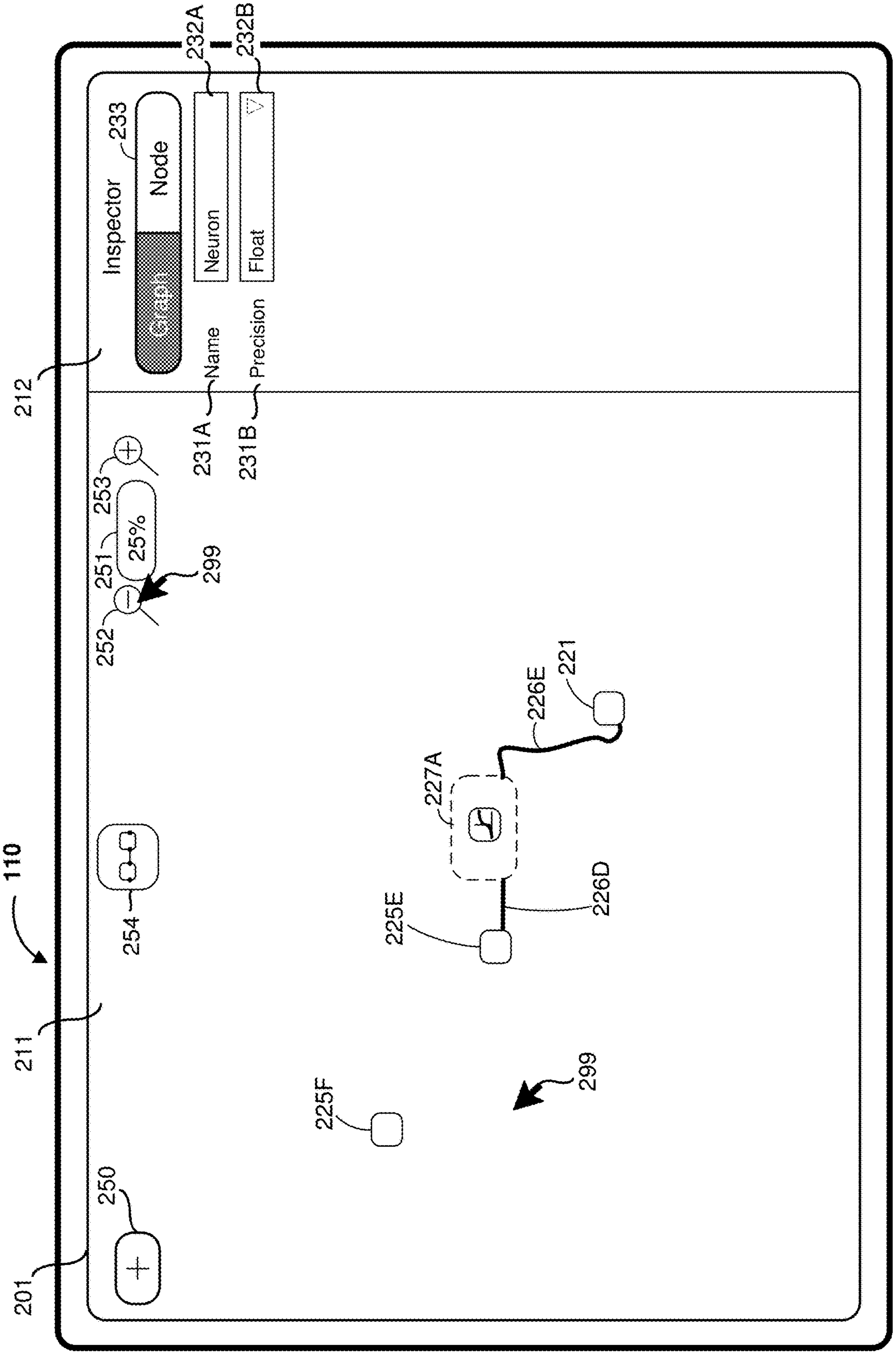
Figure 2X:
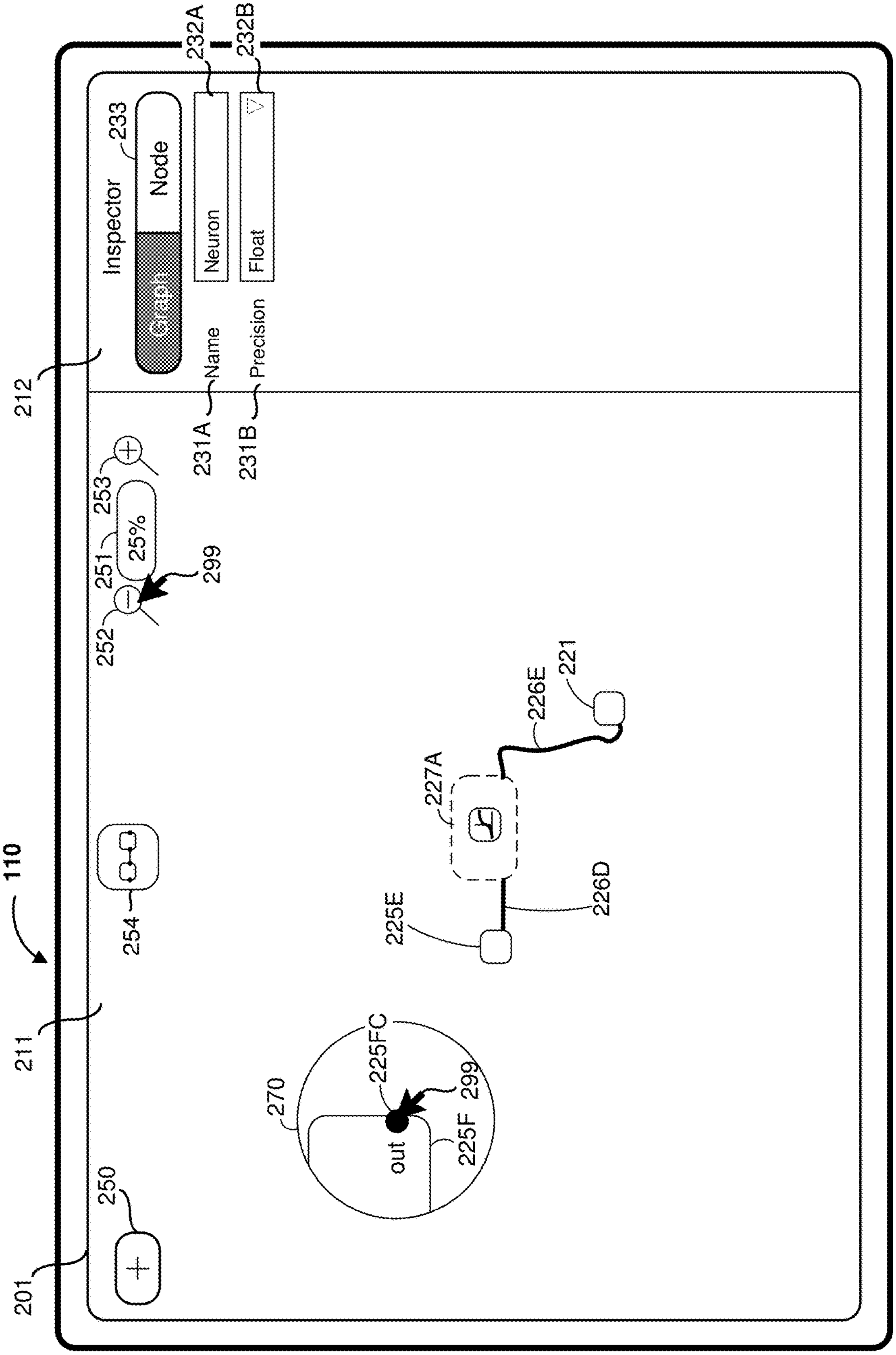
Figure 2Y:
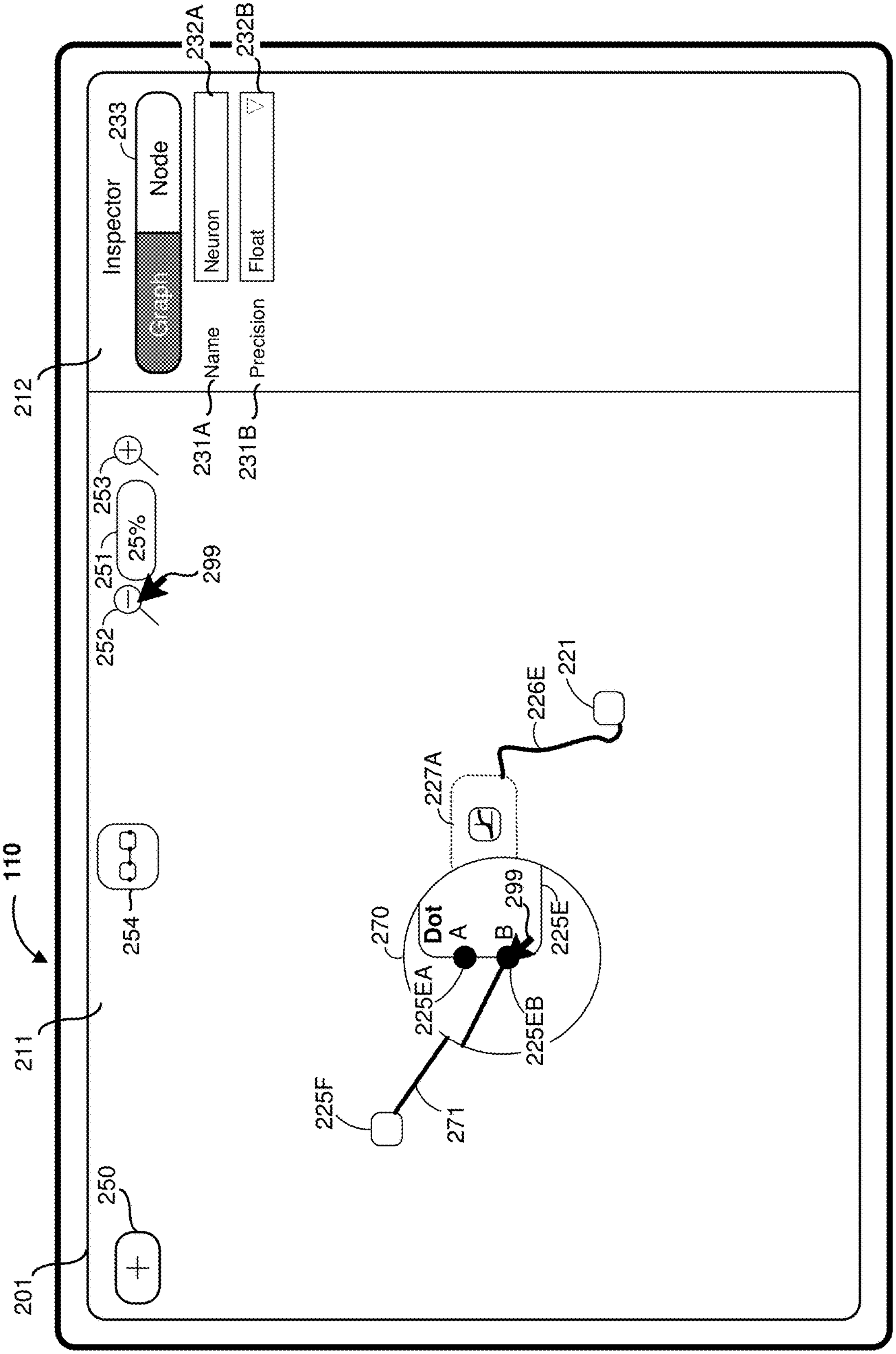
Figure 2Z:
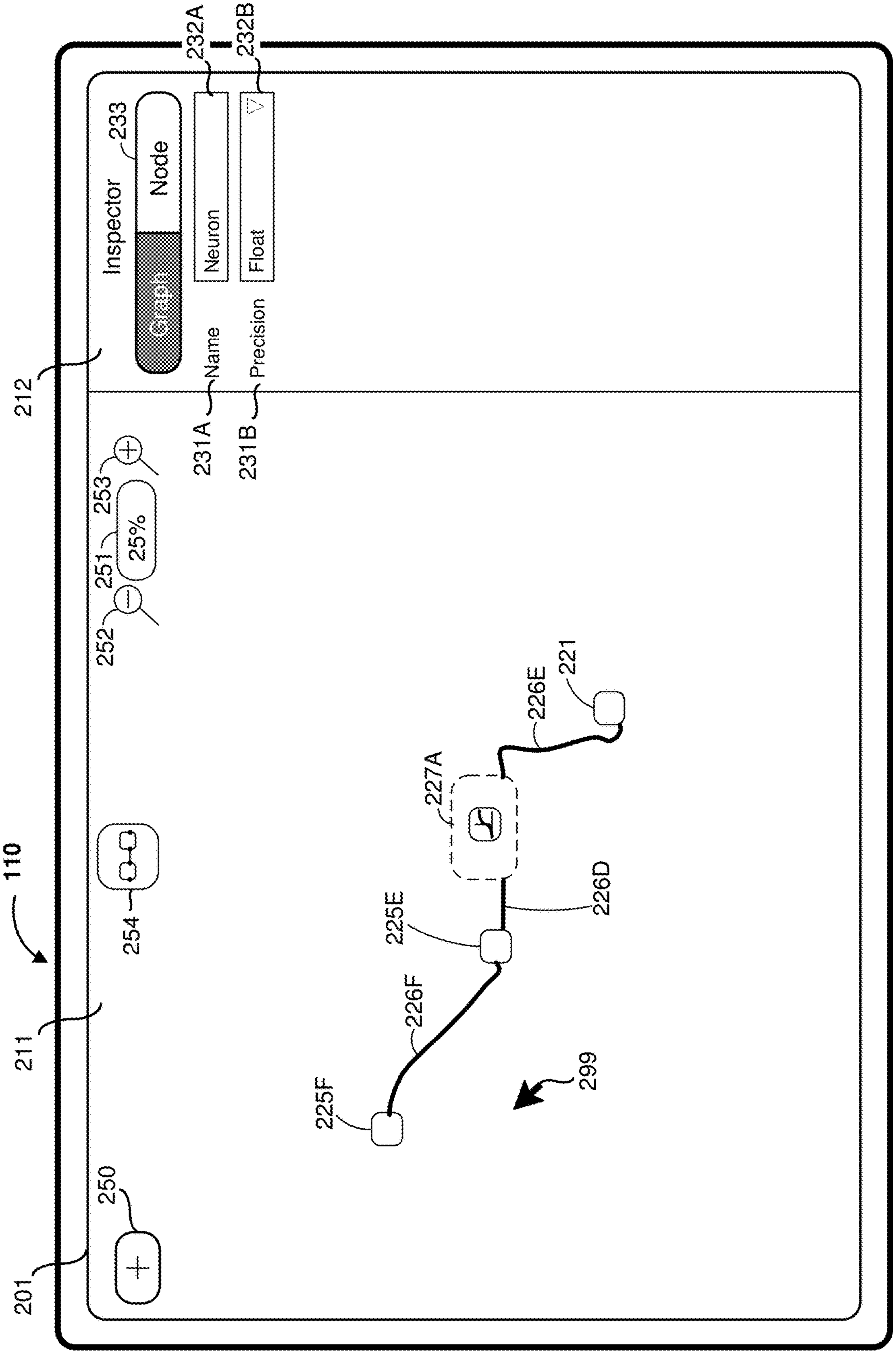

FIGS. 2A-2Z illustrate a GUI 201 presented on the electronic device 110 of FIG. 1 while user inputs are received to generate a node graph that outputs a value of a neuron of a deep-learning neural network. In particular, FIGS. 2A-2Z illustrate a workflow for generating a node graph that receives, as an input, a vector of input values, x. The node graph outputs a logistic activation function applied to the dot product of the input values, x, and a weight vector, w.

In particular, the output, y, of the node graph is:

$$y = \frac{1}{1 + e^{-x^T w}}.$$

FIG. 2A illustrates the electronic device 110 displaying a graphical user interface (GUI) 201 for generating a node graph. The GUI 201 may be part of a prototyping application for composing a scene. In various implementations, an application of the electronic device 110 or a different electronic device executes to present the scene. In various implementations, the GUI 201 can be used to compose a two-dimensional scene and the electronic device 110 (or a different electronic device) executes to present the two-dimensional scene on a display. In various implementations, the GUI 201 can be used to compose a three-dimensional scene and the electronic device 110 (or a different electronic device) executes to present the three-dimensional scene in a three-dimensional environment, such as a virtual environment or in association with a representation of a physical environment.

The GUI 201 includes a node graph region 211 and an inspector region 212. The node graph region 211 includes a field-of-view of a node graph space in which nodes may be located. For example, the node graph region 211 includes an outputs node 221 at a location in the node graph space within the field-of-view of the node graph region 211. The outputs node 221 includes a precision drop-down menu 222 and an out port 223. The value that is received at the out port 223 of the outputs node 221 is the output of the node graph. The precision drop-down menu 222 displays the type of output the node graph computes. For example, the type of output may be a number, a vector of numbers, or an array of numbers. The numbers may be Boolean, integers, single-precision floating-point, double-precision floating-point, etc. For example, the type of output may be a color, e.g., a vector of three (or, if there is an alpha channel, four) floating-point numbers. The user can change the output type of the node graph by interacting with the precision drop-down menu 222 to display a list of possible output types and selecting an output type from the list. In FIG. 2A, the precision drop-down menu 222 indicates that the output of the node graph is one single-precision floating-point number.

The inspector region 212 includes information regarding properties of the node graph. For example, the inspector region 212 includes a plurality of representations of properties of the node graph 231A-231B and a plurality of representations of values of the properties of the node graph 232A-232B. For example, the inspector region 212 includes a representation of a name property of the node graph 231A indicative of a name of the node graph and a representation of a value of the name property of the node graph 232A. In FIG. 2A, the representation of the name property of the node graph 231A is the text "Name" and the representation of the value of the name property of the node graph 232A is the text "Neuron". The user can change the name of the node graph by interacting with the representation of the value of the name property of the node graph 232A and typing a new name. As another example, the inspector region 212 includes a representation of a precision property of the node graph 231B indicative of a default precision value for new nodes and a representation of a value of the precision property of the node graph 232B. In FIG. 2A, the representation of the precision property of the node graph 231B is the text "Precision" and the representation of the value of the precision property of the node graph 232B is the text "Float" (indicating a single-precision floating-point value). The user can change the default precision value by interacting with the representation of the value of precision property of the node graph 232B to display a list of possible precision values and selecting a precision value from the list.

The inspector region 212 includes a properties indicator 233 that indicates whether the inspector region 212 displays representations of properties of the node graph or representations of properties of a selected node.

The node graph region 211 further includes an add node affordance 250 for adding nodes to the node graph, an auto-layout affordance 254 for automatically adjusting the location of nodes in the node graph, a zoom indicator 251 that indicates a zoom level of the node graph region 211, a zoom-out affordance 252 that decreases the zoom level, and a zoom-in affordance 253 that increases the zoom level.

The GUI 201 further includes a cursor 299 for interacting with the GUI 201. In FIG. 2A, the cursor 299 is displayed over the add node affordance 250.

FIG. 2B illustrates the GUI 201 of FIG. 2A in response to detecting activation of the add node affordance 250. For example, in various implementations, the electronic device 110 detects a click of a mouse button while the cursor 299 is displayed over the add node affordance 250. In various implementations, the electronic device 110 detects activation of a user interface element in various ways. For example, in various implementations, the electronic device 110 detects a click of a mouse button while the cursor 299 is displayed over the user interface element. As another example, the electronic device 110 detects a press on a trackpad while the cursor 299 is displayed over the user interface element. As another example, in various implementations, the device detects a finger touching the electronic device 110 at the location the user interface element is displayed. As another example, in various implementations, the electronic device 110 detects a hand gesture while a user is looking at the user interface element. As another example, in various implementations, the electronic device 110 detects activation of a switch device while focus is directed to the user interface element.

In response to detecting activation of the add node affordance 250, the GUI 201 includes a nodes window 260. The nodes window 260 includes a plurality of node class drop-down menus 262A-262D. The nodes window 260 further includes a search bar 261 for searching for available nodes. Although only four node class drop-down menus 262A-

262D are displayed in FIG. 2B, it is to be appreciated that there may be any number of node class drop-down menus 262A-262D. The plurality of node class drop-down menus 262A-262D include an artistic drop-down menu 262A. When the artistic drop-down menu 262A is activated, the artistic drop-down menu 262A expands to display representations of available artistic nodes. The plurality of node class drop-down menus 262A-262D include an input drop-down menu 262B. When the input drop-down menu 262B is activated, the input drop-down menu 262B expands to display representations of available input nodes. The plurality of node class drop-down menus 262A-262D include a math drop-down menu 262C. When the math drop-down menu 262C is activated, the math drop-down menu 262C expands to display representations of available math nodes. The plurality of node class drop-down menus 262A-262D include a utility drop-down menu 262D. When the utility drop-down menu 262D is activated, the utility drop-down menu 262D expands to display representations of available utility nodes.

In FIG. 2B, the cursor 299 is displayed over the math drop-down menu 262C.

FIG. 2C illustrates the GUI 201 of FIG. 2B in response to detecting activation of the math drop-down menu 262C. In response to detecting activation of the math drop-down menu 262C, the math drop-down menu 262C expands to display a plurality of representations of available math nodes 263A-263E. Although only five representations of available math nodes 263A-263E are displayed in FIG. 2C, it is to be appreciated that there may be any number of representations of available math nodes 263A-263E. The plurality of representations of available math nodes 263A-263E includes a representation of an available add node 263A. When the representation of an available add node 263A is activated, an add node is added to the node graph which takes A and B as inputs and outputs A+B. The plurality of representations of available math nodes 263A-263E includes a representation of an available exponential node 263B. When the representation of an available exponential node 263B is activated, an exponential node is added to the node graph which takes an input and outputs the exponential of the input (e.g., the constant e to the power of the input). The plurality of representations of available math nodes 263A-263E includes a representation of an available power node 263C. When the representation of an available power node 263C is activated, a power node is added to the node graph which takes A and B as inputs and outputs $A^B$. The plurality of representations of available math nodes 263A-263E includes a representation of an available multiply node 263D. When the representation of an available multiply node 263D is activated, a multiply node is added to the node graph which takes A and B as inputs and outputs A×B. The plurality of representations of available math nodes 263A-263E includes a representation of an available subtract node 263E. When the representation of an available subtract node 263E is activated, a subtract node is added to the node graph which takes A and B as inputs and outputs A−B.

At a node, the output value is determined as a function of input values received at respective ports from other nodes. If no node is connected to a particular port, the output value is determined using a default value for the port.

In FIG. 2C, the cursor 299 is displayed over the representation of an available subtract node 263E.

FIG. 2D illustrates the GUI 201 of FIG. 2C in response to detecting activation of the representation of an available subtract node 263E. In response to detecting activation of the representation of an available subtract node 263E, the nodes window 260 ceases to be displayed and the node graph region 211 includes a subtract node 225A. The subtract node 225A has an A input port 225AA, a B input port 225AB, and an output port 225AC. When the A input port 225AA is connected to the output port of a node outputting 0 and the B input port 225AB is connected to the output port of a node outputting $x^Tw$, the first subtract node 225A outputs $-x^Tw$ at the output port 225AC.

In FIG. 2D, the cursor 299 is displayed over the add node affordance 250.

FIG. 2E illustrates the GUI 201 of FIG. 2D in response to detecting the user add an exponential node 225B to the node graph. For example, in various implementations, the user activates the add node affordance 250, activates the math drop-down menu 262C, and activates the representation of an available exponential node 263B. In response to detecting the user add the exponential node 225B to the node graph, the node graph region 211 includes the exponential node 225B. The exponential node 225B has an input port 225BA and an output port 225BB. When the input port 225BA is connected to the output port of a node outputting $-x^Tw$, the exponential node 225B outputs $\exp(-x^Tw)$ at the output port 225BB.

In FIG. 2E, the cursor 299 is displayed over the output port 225AC of the subtract node 225A.

FIG. 2F illustrates the GUI 201 of FIG. 2E in response to detecting the user connect the output port 225AC of the subtract node 225A and the input port 225BA of the exponential node 225B. For example, in various implementations, the user connects the output port 225AC of the subtract node 225A and the input port 225BA of the exponential node 225B by pressing down a mouse button while the cursor 299 is at the location of the output port 225AC of the subtract node 225A, moving the cursor 299 to the location of the input port 225BA of the exponential node 225B, and releasing the mouse button. In response to detecting the user connecting the output port 225AC of the subtract node 225A and the input port 225BA of the exponential node 225B, the node graph region 211 includes a first edge 226A between the output port 225AC of the subtract node 225A and the input port 225BA of the exponential node 225B.

In FIG. 2F, the cursor 299 is displayed over the add node affordance 250.

FIG. 2G illustrates the GUI 201 of FIG. 2F in response to detecting the user add an add node 225C and a second edge 226B to the node graph. In response to detecting the user add the add node 225C and the second edge 226B to the node graph, the node graph region 211 includes the add node 225C. The add node 225C has an A input port 225CA, a B input port 225CB, and an output port 225CC. When the A input port 225CA is connected to the output port of a node outputting 1 and the B input port 225CB is connected to the output port of a node outputting $\exp(-x^Tw)$, the add node 225C outputs $1+\exp(-x^Tw)$ at the output port 225CC. Further, in response to detecting the user add the add node 225C and the second edge 226B to the node graph, the node graph region 211 includes the second edge 226B connecting the output port 225BB of the exponential node 225B to the B input port 225CB of the add node 225C.

In FIG. 2G, the cursor 299 is displayed over the add node 225C.

FIG. 2H illustrates the GUI 201 of FIG. 2G in response to detecting the user select the add node 225C. For example, in various implementations, the user activates the add node 225C. In response to detecting the user select the add node 225C, the add node 225C is selected and displayed with an indication of selection. For example, in FIG. 2H, the add node 225C is displayed with an increased line width. In various implementations, the indication of selection is a highlighting (or glow effect) or a change of color (of the border or the entire node).

Also in response to detecting the user select the add node 225C, the inspector region 212 replaces the plurality of representations of properties of the node graph 231A-231B and the plurality of representations of values of the properties of the node graph 232A-232B with a plurality of representations of properties of a selected node 233A-233B, a plurality of representations of values of the properties of the selected node 234A-234B, a plurality of representations of the inputs 236A-236B, and a plurality of representations of default values of the inputs 237A-237B.

For example, the inspector region 212 includes a representation of a precision property of the selected node 233A indicative of a precision value for the selected node and a representation of a value of the precision property of the selected node 234A. In FIG. 2H, the representation of the precision property of the selected node 233A is the text "Precision" and the representation of the value of the precision property of the selected node 234A is the text "Float" (indicating a single-precision floating-point value). The user can change the precision value of the add node 225C by interacting with the representation of the value of precision property of the selected node 234A to display a list of possible precision values and selecting a precision value from the list.

As another example, the inspector region 212 includes a representation of an optimization property of the selected node 233B indicative of a mode for determining the output value of the selected node and a representation of a value of the optimization property of the selected node 234B. In FIG. 2H, the representation of the optimization property of the selected node 233B is the text "Optimization" and the representation of the value of the optimization property of the selected node 234B is the text "Speed" (indicating the algorithm used to determine the output is optimized for speed rather than, for example, accuracy or power savings). The user can change the algorithm used to determine the output of the add node 225C by interacting with the representation of the value of optimization property of the selected node 234B to display a list of possible optimizations and selecting an optimization from the list.

The inspector region 212 includes a representation of an A input 236A and a representation of a default value for the A input 237A. In FIG. 2H, the representation of the A input is the text "A" and the representation of the default value for the A input is the text "0". The user can change the default value for the A input by interacting with the representation of the default value for the A input 237A and typing a new default value. The inspector region 212 includes a representation of a B input 236B and a representation of a default value for the B input 237B. In FIG. 2H, the representation of the B input is the text "B" and the representation of the default value for the B input is the text "0". The user can change the default value for the B input by interacting with the representation of the default value for the B input 237B and typing a new default value.

In FIG. 2H, the cursor 299 is displayed over the representation of the default value for the A input 237A.

FIG. 2I illustrates the GUI 201 of FIG. 2H in response to detecting the user change the default value for the A input of the add node 225C from zero to one. In response to detecting the user change the default value for the A input of the add node 225C from zero to one, the representation of the default value for the A input 237A is the text "1". Thus, in FIG. 2I, when the B input port 225CB of the add node 225C is connected to the output port of a node outputting $\exp(-x^Tw)$ and the A input port 225CA of the add node 225C is unconnected, the add node 225C outputs $1+\exp(-x^Tw)$ at the output port 225CC. Alternatively, a user can add an integer node that outputs the number 1 at an output port and connect that output port to the A input port 225CA.

In response to detecting the user change the default value for the A input of the add node 225C from zero to one, a value indicator 225CD is displayed in association with the A input port 225CA of the add node 225C. For example, in FIG. 2I, the value indicator 225CD is displayed to left of and next to the A input port 225CA. In various implementations, the value indicator 225CD is displayed to the right of and next to the A input port 225CA (e.g., within the add node 225C). In various implementations, a value indicator is displayed in association with an input node in response to a determination that the default value has been changed from a predefined default value associated with the input node (e.g., an original default value or default default value). As discussed below, in various implementations, the value indicator is displayed in response to a user input and/or depending on the level of zoom.

In FIG. 2I, the cursor 299 is displayed over the A input port 225AA of the subtract node 225A.

FIG. 2J illustrated the GUI 201 of FIG. 2I in response to detecting the user activate the A input port 225AA of the subtract node 225A. In response to detecting the user activate the A input port 225AA of the subtract node 225A, the subtract node 225A is selected and a value indicator 225AD is displayed indicating the default value of the A input of the subtract node 225A (e.g., indicating the value of zero with the text "0").

In response to the selection of the subtract node 225A, the inspector region 212 replaces updates the plurality of representations of values of the properties of the selected node 234A-234B and the plurality of representations of default values of the inputs 237A-237B.

In FIG. 2J, the cursor 299 is displayed over the representation of the add node affordance 250.

FIG. 2K illustrates the GUI 201 of FIG. 2J in response to detecting the user add a reciprocal node 225D and a third edge 226C to the node graph. In response to detecting the user add the reciprocal node 225D and the third edge 226C to the node graph, the node graph region 211 includes the reciprocal node 225D. The reciprocal node 225D has an input port 225DA and an output port 225DB. When the input port 225DA is connected to the output port of a node outputting $1+\exp(-x^Tw)$, the reciprocal node 225D outputs $(1+\exp(-x^Tw))^{-1}$ at the output port 225DB. Further, in response to detecting the user add the reciprocal node 225D and the third edge 226C to the node graph, the node graph region 211 includes the third edge 226C connecting the output port 225CC of the add node 225C to the input port 225DA of the reciprocal node 225D.

In FIG. 2K, the subtract node 225A is unselected and the inspector region 212 once again displays information regarding properties of the node graph rather than a selected node.

In FIG. 2K, the cursor 299 is displayed above and to the left of the subtract node 225A and, in FIG. 2L, the cursor 299 is displayed below and to the right of the reciprocal node 225D.

FIG. 2L illustrates the GUI 201 of FIG. 2K in response to detecting the user select the subtract node 225A, the exponential node 225B, the add node 225C, and the reciprocal node 225D. In various implementations, the user selects these nodes 225A-225D by clicking a mouse button while the cursor is above and to the left of the nodes 225A-225D, moving the cursor to a position below and to the right of the nodes 225A-225D, and releasing the mouse button. In response to detecting selection of the nodes 225A-225D, each of the nodes 225A-225D is displayed with an indication of selection.

FIG. 2M illustrates the GUI 201 in response to detecting the user group the nodes 225A-225D. In various implementations, the user groups the nodes 225A-225D by clicking a grouping affordance (not shown) which may be displayed in response to right-clicking a mouse. In various implementations, the user groups the nodes 225A-225D by pressing a hot-key combination (e.g., CTRL+G). In response to detecting the user group the nodes 225A-225D, the GUI 201 includes a group representation 227A indicating that the nodes 225A-225D belong to a group. In FIG. 2M, the group representation 227A includes a boundary surrounding the nodes 225A-225D.

The group representation 227A includes a group name 227AA, a group descriptor 227AB, and a group icon 227AC. The group name 227AA includes text indicating a name of the group. In FIG. 2M, the text is default text reading "Group1". The group descriptor 227AB includes text indicating a description of the group. In FIG. 2M, the text is default text reading "Description". In various implementations, the group name 227AA is displayed more prominently than the group descriptor 227AB. For example, in various implementations, the group name 227AA is displayed with a larger font than the group descriptor 227AB. In various implementations, the group name 227AA is displayed with a bold font type whereas the group descriptor 227AB is displayed with a non-bold font type. As described further below, in various implementations, at a first zoom level, the group name 227AA and group descriptor 227AB are displayed and, at a second zoom level, the group name 227AA is displayed and the group descriptor 227AB is not displayed. In various implementations, the group descriptor 227AB may be used by a composing user to provide comments regarding the group. In FIG. 2M, the group icon 227AC is default group icon.

In FIG. 2M, the cursor 299 is displayed over the group name 227AA.

FIG. 2N illustrates the GUI 201 of FIG. 2M in response to detecting the user change the group name 227AA, the group descriptor 227AB, and the group icon 227AC. In various implementations, the user changes the group name 227AA, the group descriptor 227AB, and/or the group icon 227AC by clicking a mouse when the cursor 299 is at its location. In response to detecting the user change the group name 227AA, the group descriptor 227AB, and the group icon 227AC, the group name includes text reading "Activation Function", the group descriptor 227AB includes text reading "We use a logistic sigmoid for differentiability", and the group icon 227AC is a sigmoid function icon.

In FIG. 2N, the cursor 299 is displayed over the representation of the add node affordance 250.

FIG. 2O illustrates the GUI 201 of FIG. 2N in response to detecting the user add a dot product node 225E, a fourth edge 226D, and a fifth edge 226E to the node graph. In response to detecting the user add the dot product node 225E, the fourth edge 226D, and a fifth edge 226E to the node graph, the node graph region 211 includes the dot product node 225E. The dot product node 225E has an A input port 225EA, a B input port 225EB, and an output port 225EC. When the A input port 225EA is connected to the output port of a node outputting x and the B input port 225EB is connected to the output port of a node outputting w, the dot product node 225E outputs $x^T w$ at the output port 225EC. Further, in response to detecting the user add the dot product node 225E, the fourth edge 226D, and the fifth edge 226E to the node graph, the node graph region 211 includes the fourth edge 226D connecting the output port 225EC of the dot product node 225E to the B input port 225AB of the subtract node 225A. Further, in response to detecting the user add the dot product node 225E, the fourth edge 226D, and the fifth edge 226E, the node graph region 211 includes the fifth edge 226E connecting the output port 225DB of the reciprocal node 225D to the out port 223 of the outputs node 221. Thus, when the A input port 225EA is connected to the output port of a node outputting x, the output of the node graph is $(1+\exp(-x^T w))^{-1}$.

In FIG. 2O, the cursor 299 is displayed over the dot product node 225E.

FIG. 2P illustrates the GUI 201 of FIG. 2O in response to detecting the user select the dot product node 225E. In response to detecting the user select the dot product node 225E, the dot product node 225E is selected and displayed with an indication of selection. For example, in FIG. 2P, the dot product node 225E is displayed with an increased line width.

Also in response to detecting the user select the dot product node 225E, the inspector region 212 once again displays information regarding the selected node rather than information regarding the node graph.

In FIG. 2P, the cursor 299 is displayed over the dot product node 225E.

FIG. 2Q illustrates the GUI 201 of FIG. 2P in response to detecting the user move the dot product node 225E over the group representation 227A. In response to detecting the user move the dot product node 225E over the group representation 227A, the dot product node 225E is moved over the group representation 227A and displayed with an indication of exclusion indicating that the dot product node 225E is not part of the group including the nodes 225A-225D. For example, in FIG. 2Q, the dot product node 225E is displayed with a dashed line. In various implementations, the indication of exclusion is a highlighting (or glow effect) or a change of color (of the border or the entire node). In various implementations, the indication of exclusion is a partial transparency or a drop shadow.

In various implementations, the indication of exclusion is different than the indication of selection. For example, in various implementations, the indication of selection and indication of exclusion are two different colors. In various implementations, the indication of exclusion and indication of selection are not mutually exclusive and can be displayed at the same time. For example, in FIG. 2Q, the dot product node 225E is displayed with an indication of selection of an increased line width and an indication of exclusion of a dashed line.

As described above, in various implementations, moving a node over a group representation does not add the node to the group and the indication of exclusion is displayed. However, in various implementations, moving a node over a group representation adds the node to the group and the indication of exclusion is not displayed. In various implementations, moving a group representation over a node does not add the node to group and the indication of exclusion is displayed. However, in various implementations, moving a group representation over a node adds the node to the group and the indication of exclusion is not displayed.

In various implementations, when a node is over a group representation and the indication of exclusion is displayed, the node is eligible to be added to the group and a user may add the node to the group by clicking an affordance or pressing a hot-key combination (e.g., CTRL+G).

In FIG. 2Q, the cursor 299 is displayed over the auto-layout affordance 254.

FIG. 2R illustrates the GUI 201 of FIG. 2Q in response to detecting activation of the auto-layout affordance 254. In response to detecting activation of the auto-layout affordance, an auto-layout function is applied to the node graph in which one or more nodes of the node graph are automatically moved to new locations in the node graph space. In various implementations, the new locations are selected to increase, decrease, or normalize spacing between nodes and/or alignment of nodes. In various implementations, the new locations are selected to enhance readability of the node graph. In various implementations, the new locations are chosen to reflect a logical flow of the function described by the node graph.

Accordingly, in FIG. 2R, the dot product node 225E and the outputs node 221 are moved to new locations in the node graph space outside the field-of-view of the node graph region 211. The auto-layout function treats a group representation as a single node. Thus, while the group representation 227A may be moved in the node graph space, the relative locations of the nodes 225A-225D within the group representation 227A are unchanged.

In FIG. 2R, the cursor 299 is displayed over the group representation 227A.

FIG. 2S illustrates the GUI 201 of FIG. 2R in response to applying the auto-layout function to the group representation 227A. For example, in various implementations, the user can trigger application of the auto-layout function to the group representation 227A by selecting the group representation 227A and activating the auto-layout affordance 254. In response to applying the auto-layout function to the group representation, one or more nodes of the group representation 227A are automatically moved to new locations in the node graph space relative to one or more other nodes of the group representation 227A. For example, in FIG. 2S, the reciprocal node 225D is moved to align with the subtract node 225A, the exponential node 225B, and the add node 225C. In response to applying the auto-layout function to the group representation, the other nodes (e.g., the outputs node 221 and the dot product node 225E) are not moved.

In FIG. 2S, the cursor 299 is displayed over the zoom-out affordance 252.

FIG. 2T illustrates the GUI 201 of FIG. 2S in response to detecting activation of the zoom-out affordance 252. In response to detecting activation of the zoom-out affordance 252, the zoom level is decreased. As a result, the field-of-view of the node graph region 211 is increased and the size of the node graph (and its constituent nodes) within the node graph region 211 is decreased. In various implementations, based on the zoom level, at least one of the nodes is changed from a first representation to a second representation. Similarly, based on the zoom level, the group representation 227A is changed from a first representation to a second representation.

In various implementations, shrinking a node by decreasing the zoom level may make text difficult to read. Accordingly, in various implementations, when the zoom level is above a first threshold, a node is displayed with a text representation of the node type of the node, but when the zoom level is below the first threshold, the node is displayed with a symbolic or graphic representation of the node type. For example, whereas, in FIG. 2S, the subtract node 225A was displayed with a first representation including the text "Subtract", in FIG. 2T, the subtract node 225A is displayed with a second representation including, instead, a minus sign. Further, in various implementations, when the zoom level is above a second threshold, ports of a node are displayed with corresponding labels, but when the zoom level is below the second threshold, the ports of the node are displayed without corresponding labels. For example, whereas, in FIG. 2S, the input port 225BA of the exponential node 225B is displayed with a label reading "in", in FIG. 2T, the input port 225BA of the exponential node 225B is displayed without the label. Further, in various implementations, when the zoom level is above a third threshold, all value indicators are displayed, but when the zoom level is below the third threshold, only value indicators which display a changed default value are displayed. For example, in FIG. 2T, the value indicator 225CD associated with the A input port 225CA of the add node 225C is displayed, but the value indicator 225AD associated with the A input port 225AA of the subtract node 225A is not displayed.

In various implementations, when the zoom level is above a fourth threshold, the group representation 227A is displayed with the group descriptor 227AB, but when the zoom level is below the fourth threshold, the group representation 227A is displayed without the group descriptor 227AB. For example, in FIG. 2T, the group representation 227A is displayed without the group descriptor 227AB.

In FIG. 2T, the cursor 299 is displayed over the zoom-out affordance 252.

FIG. 2U illustrates the GUI 201 of FIG. 2T in response to detecting activation of the zoom-out affordance 252. In response to detecting activation of the zoom-out affordance 252, the zoom level is further decreased. As a result, the field-of-view of the node graph region 211 is further increased and the size of the node graph (and its constituent nodes) within the node graph region 211 is further decreased.

In various implementations, when the zoom level is above a sixth threshold, ports of a node are displayed, but when the zoom level is below the sixth threshold, the ports of the node are not displayed. For example, whereas in FIG. 2T, the input port 225DA of the reciprocal node 225D is displayed, in FIG. 2U, the input port 225DA of the reciprocal node 225D is not displayed. In various implementations, when the zoom level is above a seventh threshold, value indicators which display a changed default value are displayed, but when the zoom level is below the seventh threshold, no value indicators are displayed. For example, in FIG. 2U, the value indicator 225CD associated with the A input port 225CA of the add node 225C is not displayed.

In various implementations, when the zoom level is above an eighth threshold, the group representation 227A is displayed with the group name 227AA, but when the zoom level is below the eighth threshold, the group representation 227A is displayed without the group name 227AA. For example, in FIG. 2U, the group representation 227A is displayed without the group name 227AA.

In FIG. 2U, the cursor 299 is displayed over the zoom-out affordance 252.

FIG. 2V illustrates the GUI 201 of FIG. 2U in response to detecting activation of the zoom-out affordance 252. In response to detecting activation of the zoom-out affordance 252, the zoom level is even further decreased. As a result, the field-of-view of the node graph region 211 is even further increased and the size of the node graph (and its constituent nodes) within the node graph region 211 is even further decreased.

In various implementations, when the zoom level is above a ninth threshold, a node includes a symbolic or graphical representations of the node type, but when the zoom level is below the ninth threshold, the node does not include any representation of the node type. For example, whereas in FIG. 2U, the dot product node 225E included the symbolic dot product representation $a^Tb$, in FIG. 2V, the dot product node 225E is blank.

In various implementations, when the zoom level is above a tenth threshold, the group representation 227A includes representations of the nodes 225A-225D of the group and the edges 226A-226C between them, but when the zoom level is below a tenth threshold, the group representation 227A does not include representations of the nodes 225A-225D of the group or the edges 226A-226C between them. For example, in FIG. 2V, the group representation 227A includes only the group icon 227AC.

In FIG. 2V, the cursor 299 is displayed over the add node affordance 250.

FIG. 2W illustrates the GUI 201 of FIG. 2V in response to detecting the user add a weights node 225F that outputs the weights vector, w. In response to detecting the user add the weights node 225F, the node graph region 211 includes the weights node 225F which includes an output port 225FC that outputs the weights vector, w. In FIG. 2W, the cursor 299 is displayed in the node graph region 211, but not over any node.

FIG. 2X illustrates the GUI 201 of FIG. 2W in response to detecting the user move the cursor 299 over the weights node 225F. In response to detecting the user move the cursor 299 over the weights node 225F, the node graph region 211 includes a magnification region 270 surrounding the cursor 299 that displays the node graph region 211 at an increased zoom level. Accordingly, whereas other ports of the node graph are not displayed in the node graph region 211, the output port 225FC of the weights node 225F is displayed within the magnification region 270.

In FIG. 2X, the cursor 299 is displayed over the output port 225FC of the weights node 225F.

FIG. 2Y illustrates GUI 201 of FIG. 2X in response to detecting the user select the output port 225FC of the weights node 225F and move the cursor 299 to the location of the B input port 225EB of the dot product node 225E. In response to detecting the user move the cursor 299 to the location of the dot product node 225E, the magnification region 270 displays the B input port 225EB of the dot product node 225E. In response to detecting the user move the cursor 299 while the output port 225FC of the weights node 225F is selected, the node graph region 211 includes a potential edge 271.

In FIG. 2Y, the cursor 299 is displayed over the B input port 225EB of the dot product node 225E.

FIG. 2Z illustrates the GUI 201 of FIG. 2Y in response to detecting the user select the B input port 225EB of the dot product node 225E. In response to detecting the user select the B input port 225EB of the dot product node 225E, the node graph region 211 includes a sixth edge 226F connecting the output port 225FC (not shown) of the weights node 225F to the B input port 225EB (not shown) of the dot product node 225E.

Figure 3:
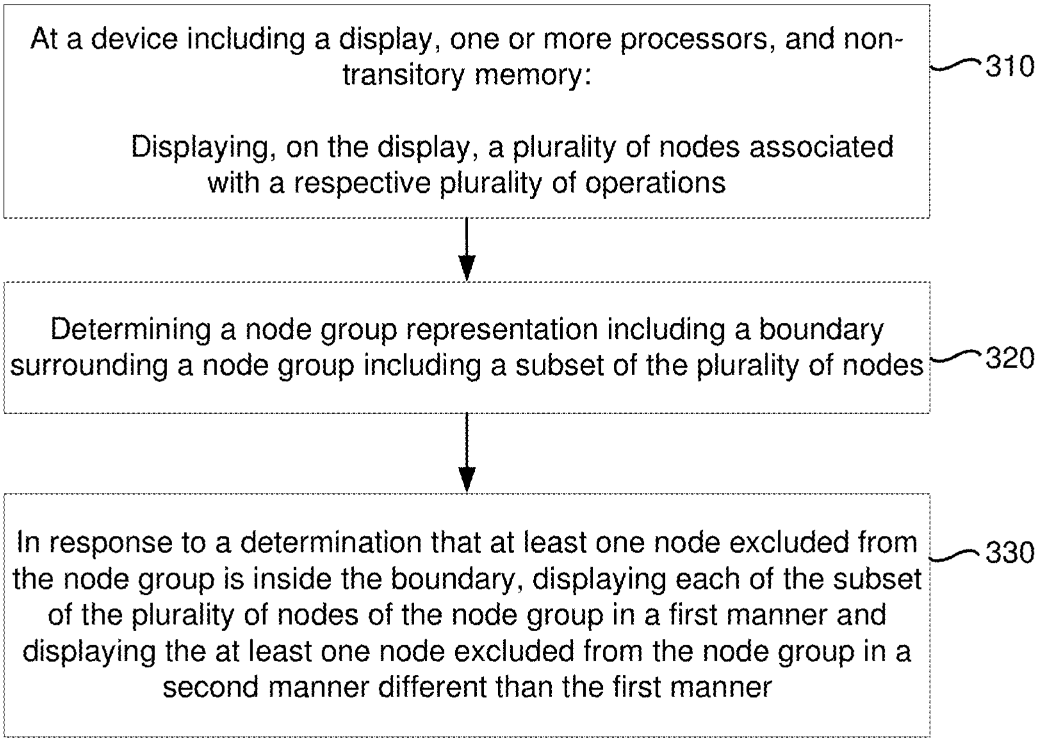
FIG. 3 is a flowchart representation of a method of displaying a node graph including a node group representation in accordance with some implementations.

FIG. 3 is a flowchart representation of a method 300 of displaying a node graph including a node group representation in accordance with some implementations. In various implementations, the method 300 is performed by a device with a display, one or more processors, and non-transitory memory. In some implementations, the method 300 is performed by processing logic, including hardware, firmware, software, or a combination thereof. In some implementations, the method 300 is performed by a processor executing instructions (e.g., code) stored in a non-transitory computer-readable medium (e.g., a memory).

The method 300 begins, in block 310, with the device displaying, on the display, a plurality of nodes associated with a respective plurality of operations. For example, FIG. 2O illustrates the node graph region 211 including the plurality of nodes 225A-225E.

The method 300 continues, in block 320, with the device displaying a node group representation including a boundary surrounding a node group including a subset of the plurality of nodes. For example, FIG. 2O illustrates the node graph region 211 including the group representation 227A. The group representation 227A includes a boundary that surrounds the node group including the subtract node 225A, exponential node 225B, add node 225C, and reciprocal node 225D. Further, in FIG. 2O, the boundary does not include the dot product node 225E excluded from the node group.

The method 300 continues, in block 330, with the device, in response to a determination that at least one node excluded from the node group is inside the boundary, displaying each of the subset of the plurality of nodes of the node group in a first manner and displaying the at least one node excluded from the node group in a second manner different than the first manner. For example, in FIG. 2Q, in response to a determination that the dot product node 225E excluded from the node group is inside the boundary of the group representation 227A, the nodes of the node group (e.g., the subtract node 225A, exponential node 225B, add node 225C, and reciprocal node 225D) are displayed in a first manner (with a solid line as a border) and the dot product node 225E excluded from the node group is displayed in a second manner (with a dashed line as a border).

In various implementations, displaying each of the subset of the plurality of nodes of the node group in the first manner includes displaying a border of each of the subset of the plurality of nodes in the first manner and displaying the at least one node excluded from the node group in the second manner includes displaying a border of the at least one node excluded from the node group in the second manner. For example, in FIG. 2Q, the nodes of the node group are displayed with a solid border and the dot product node 225E is displayed with a dashed border. Accordingly, in various implementations, displaying each of the subset of the plurality of nodes of the node group in the first manner includes displaying each of the subset of the plurality of nodes of the node group with a solid line and displaying the at least one node excluded from the node group in the second manner includes displaying the at least one node excluded from the node group with a dashed line. In various implementations, displaying each of the subset of the plurality of nodes of the node group in the first manner includes displaying each of the subset of the plurality of nodes of the node group with a first line width and displaying the at least one node excluded from the node group in the second manner includes displaying the at least one node excluded from the node group with a second line width, wherein the first line width is different than the second line width.

In various implementations, displaying each of the subset of the plurality of nodes of the node group in the first manner includes displaying an interior of each of the subset of the plurality of nodes in the first manner and displaying the at least one node excluded from the node group in the second manner includes displaying an interior of the at least one node excluded from the node group in the second manner. For example, in various implementations, displaying each of the subset of the plurality of nodes of the node group in the first manner includes displaying each of the subset of the plurality of nodes of the node group with a first transparency (e.g., opaque) and displaying the at least one node excluded from the node group in the second manner includes displaying the at least one node excluded from the node group with a second transparency (e.g., partially transparent), wherein the first transparency is different than the second transparency.

In various implementations, displaying each of the subset of the plurality of nodes of the node group in the first manner includes displaying text of each of the subset of the plurality of nodes in the first manner and displaying the at least one node excluded from the node group in the second manner includes displaying text of the at least one node excluded from the node group in the second manner. For example, in various implementations, the first manner and second manner may differ in font, font size, boldness, italicization, color, etc.

In various implementations, displaying each of the subset of the plurality of nodes of the node group in the first manner includes displaying each of the subset of the plurality of nodes of the node group with a first color and displaying the at least one node excluded from the node group in the second manner includes displaying the at least one node excluded from the node group with a second color, wherein the first color is different than the second color. The border, interior, text, or any other part of a node may be different colors in the first manner as compared to the second manner.

In various implementations, displaying the at least one node excluded from the node group in the second manner includes displaying the at least one node excluded from the node group with a highlighting, glow, or drop shadow.

In various implementations, the method 300 includes displaying the subset of the plurality of nodes of the node graph and the at least one node excluded from the node graph in different manners depending on whether a node is a selected node. The different manners may be different in different ways than the first manner or the second manner. For example, in FIG. 2Q, the dot product node 225E is displayed with border having a larger line width than the subtract node 225A because the dot product node 225E is selected and the subtract node 225A is not. Further, the dot product node 225E is displayed with a dashed border and the subtract node 225A is displayed with a solid border because the dot product node 225E is excluded from the node group and the subtract node 225A is included in the node group.

In various implementations, the method 300 includes the device, in response to a determination that the at least one node excluded from the node group is outside the boundary, displaying the at least one node excluded from the node group in the first manner. For example, in FIG. 2P, the dot product node 225E is outside the boundary of the group representation 227A and is displayed in the same manner as the nodes of the node group (e.g., with a solid border).

In various implementations, the method 300 includes moving the at least one node excluded from the node group from a first location inside the boundary (where it is displayed in the second manner) to a second location outside the boundary (where it is displayed in the first manner) or from a third location outside the boundary (where it is displayed in the first manner) to a fourth location inside the boundary (where it is displayed in the second manner).

In various implementations, the method 300 include changing a location of the boundary such that the at least one node excluded from the node group changes from being inside the boundary (where it is displayed in the second manner) to outside the boundary (where it is displayed in the first manner) or from being outside the boundary (where it is displayed in the first manner) to inside the boundary (where it is displayed in the second manner). The location of the boundary may change due to a resizing of the boundary or a movement of the node group representation.

In various implementations, the node group representation further includes a group name and a group descriptor. For example, in FIG. 2Q, the group representation 227A includes the group name 227AA and the group descriptor 227AB. In various implementations, the node group representation further includes a group icon. For example, in FIG. 2Q, the group representation 227A includes the group icon 227AC.

In various implementations, the method 300 includes detecting user input to trigger an auto-layout function. In various implementations, in response to detecting the user input, the device changes a relative position of the node group representation and the at least one node excluded from the node group without changing relative positions between the subset of the plurality of nodes of the node group. For example, in FIG. 2R, in response to detecting a user input to trigger an auto-layout function, the relative position of the group representation 227A and the dot product node 225E is changed without changing the relative positions of the subtract node 225A, the exponential node 225B, the add node 225C, and the reciprocal node 225D. In various implementations, in response to detecting the user input, the device changes the relative positions between the subset of the plurality of nodes of the node group without changing a relative position of the node group representation and the least one node excluded from the node group. For example, in FIG. 2S, in response to detecting a user input to trigger an auto-layout function, the relative positions of the subtract node 225A, the exponential node 225B, the add node 225C, and the reciprocal node 225D are changed without changing the relative position of the group representation 227A and the dot product node 225E.

Figure 4:
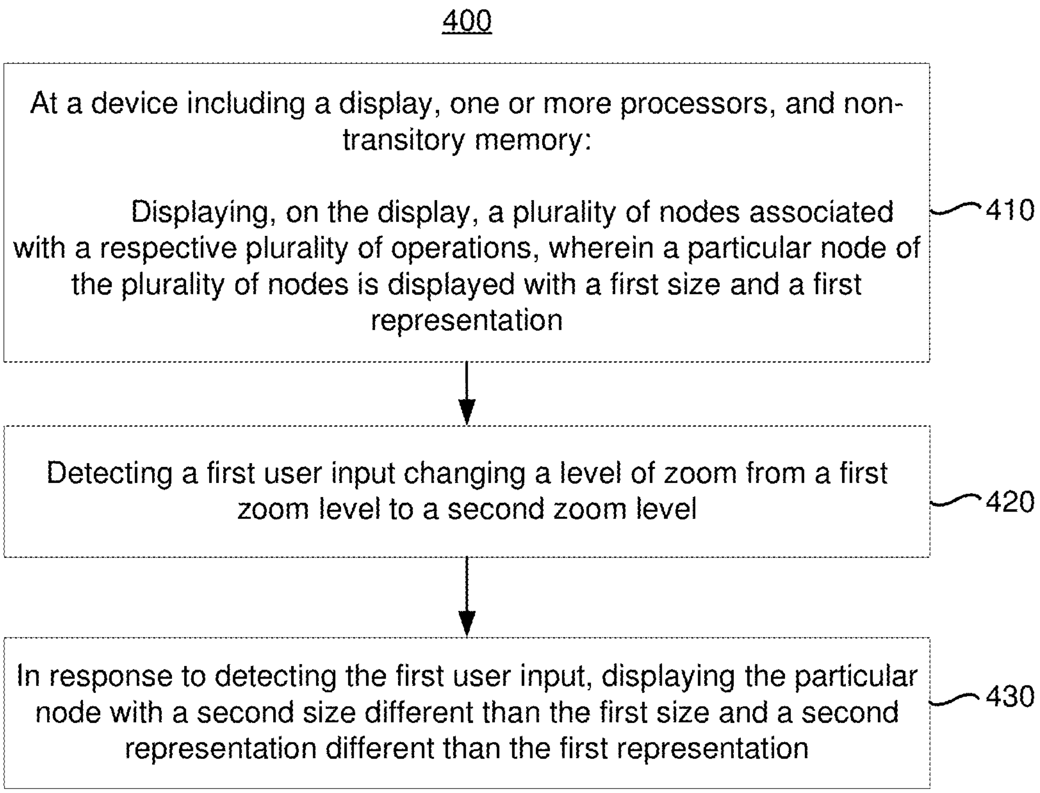
FIG. 4 is a flowchart representation of a method of displaying a node graph at different zoom levels.

FIG. 4 is a flowchart representation of a method 400 of displaying a node graph at different zoom levels in accordance with some implementations. In various implementations, the method 400 is performed by a device with a display, one or more processors, and non-transitory memory. In some implementations, the method 400 is performed by processing logic, including hardware, firmware, software, or a combination thereof. In some implementations, the method 400 is performed by a processor executing instructions (e.g., code) stored in a non-transitory computer-readable medium (e.g., a memory).

The method 400 begins, in block 410, with the device displaying, on the display, a plurality of nodes associated with a respective plurality of operations, wherein a particular node of the plurality of nodes is displayed with a first size and a first representation. For example, FIG. 2S illustrates the node graph region 211 including the plurality of nodes 225A-225D, including the subtract node 225A displayed with a first size and a first representation.

The method 400 continues, in block 420, with the device detecting a first user input changing a level of zoom from a first zoom level to a second zoom level. For example, FIG. 2S illustrates the cursor 299 over the zoom-out affordance 252.

The method 400 continues, in block 430, with the device, in response to detecting the first user input, displaying the particular node with a second size different than the first size and a second representation different than the first representation.

In various implementations, displaying the particular node with the first representation include displaying the particular node with a text representation of a node type of the particular node and displaying the particular node with the second representation includes ceasing to display the text representation of the node type of the particular node. For example, in FIG. 2S, the subtract node 225A is displayed with a text representation of the node type of the subtract node 225A (e.g., the text "Subtract") and, in FIG. 2T, the subtract node 225A is displayed without the text representation of the node type of the subtract node 225A. In various implementations, ceasing to display the text representation of the node type of the particular node includes replacing the text representation of the node type of the particular node with a symbolic representation of the node type of the particular node. For example, in FIG. 2T, the text representation of the node type of the subtract node 225A (e.g., the text "Subtract") is replaced with a symbolic representation of the node type of the subtract node 225A (e.g., a minus sign). In various implementations, displaying the particular node with the first representation includes displaying a symbolic representation of a node type of the particular node and displaying the particular node with the second representation includes ceasing to display the symbolic representation of the node type of the particular node. For example, in FIG. 2U, the dot product node 225E is displayed with a symbolic representation of the node type of the dot product node 225E (e.g., the symbols $a^{T}b$) and, in FIG. 2V, the dot product node 225E is displayed without the symbolic representation of the node type of the dot product node 225E.

In various implementations, displaying the particular node with the first representation includes displaying a text label of a port of the particular node and displaying the particular node with the second representation includes ceasing to display the text label of the port of the particular node. For example, in FIG. 2S, the add node 225C is displayed with the label "out" next to the output port 225CC of the add node 225C and, in FIG. 2T, the add node 225C is displayed without the label. In various implementations, displaying the particular node with the first representation includes displaying a value indicator of a default value of a port of the particular node and displaying the particular node with the second representation includes ceasing to display the value indicator of the default value of the port of the particular node. For example, in FIG. 2T, the add node 225C is displayed with the value indicator 225CD next to the A input port 225CA of the add node 225C and, in FIG. 2U, the add node 225C is displayed without the value indicator 225CD. In various implementations, ceasing to display the value of the indicator of the default value of the port of the particular node is further performed in response to a determination that the default value is an original default value. For example, in FIG. 2S, the subtract node 225A is displayed with the value indicator 225AD next to the A input port 225AA of the subtract node 225A and, in FIG. 2T, in response to determining that the default value for the A input is the original default value, the subtract node 225A is displayed without the value indicator 225AD.

In various implementations, displaying the particular node with the first representation includes displaying a port of the particular node and displaying the particular node with the second representation includes ceasing to display the port of the particular node. For example, in FIG. 2T, the reciprocal node 225D is displayed with the input port 225DA and the output port 225DB and, in FIG. 2U, the reciprocal node 225D is displayed without the input port 225DA and the output port 225DB.

In various implementations, displaying the particular node with the second representation is further performed in response to a determination that the second zoom level breaches a threshold (e.g., is above a threshold or below a threshold). In various implementations, the method 400 includes the device detecting second user input changing the level of zoom from the second zoom level to a third zoom level and, in response to detecting the second user input, displaying the particular node with a third size different than the second size and a third representation different than the second representation. For example, the subtract node 225A is displayed with a first representation in FIG. 2S, with a second representation in FIG. 2T, and a third representation in FIG. 2U.

In various implementations, the method 400 includes displaying a node group representation including a boundary surrounding a node group including a subset of the plurality of nodes, wherein the node group representation is displayed with a first size and a first group representation and in response to detecting the first user input, displaying the node group representation with a second size different than the first size and a second group representation different than the first group representation. For example, the group representation 227A is displayed with a first group representation in FIG. 2S and a second group representation in FIG. 2T.

In various implementations, displaying the node group representation with the first group representation include displaying the node group representation with a group name and a group descriptor and displaying the node group representation with the second representation includes ceasing to display the group descriptor. For example, in FIG. 2S, the group representation 227A is displayed with the group name 227AA and the group descriptor 227AB and, in FIG. 2T, the group representation 227A is displayed without the group descriptor 227AB. In various implementations, displaying the node group representation with the first group representation include displaying the node group representation with a group name and displaying the node group representation with the second representation includes ceasing to display the group name. For example, in FIG. 2T, the group representation 227A is displayed with the group name 227AA and, in FIG. 2U, the group representation 227A is displayed without the group name 227AA. In various implementations, displaying the node group representation with the first group representation include displaying the subset of the plurality of nodes and displaying the node group representation with the second representation includes ceasing to display the subset of the plurality of nodes. For example, in FIG. 2U, the group representation 227A is displayed with the add node 225A, the exponential node 225B, the add node 225C, and the reciprocal node 225D and, in FIG. 2V, the group representation 227A is displayed only with the group icon 227AC.

In various implementations, the method 400 includes the device, in response to detecting the cursor at the location of the particular node, displaying, within a magnification region, the particular node at the first size and the first representation.

Figure 5:
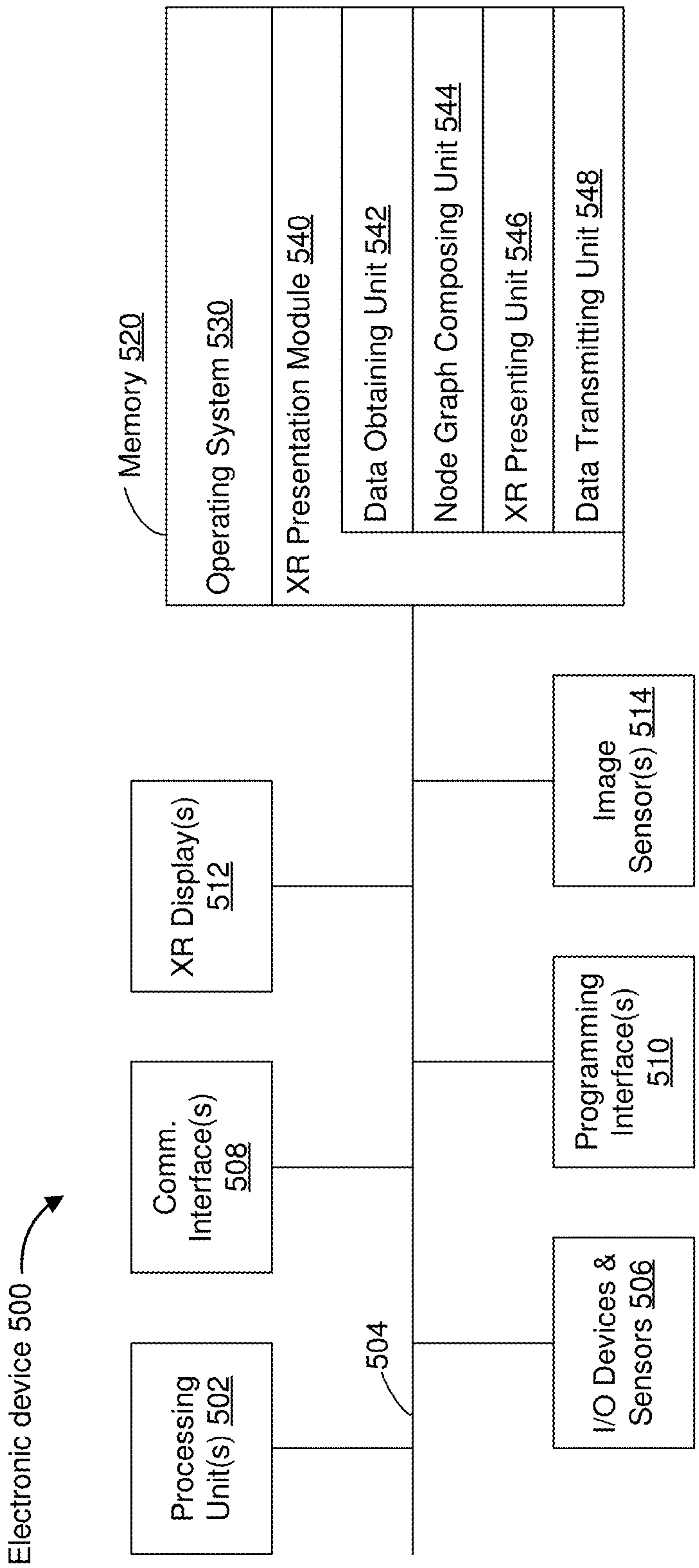
FIG. 5 is a block diagram of an electronic device in accordance with some implementations.

FIG. 5 is a block diagram of an electronic device 500 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 500 includes one or more processing units 502 (e.g., microprocessors, ASICs, FPGAs, GPUs, CPUs, processing cores, and/or the like), one or more input/output (I/O) devices and sensors 506, one or more communication interfaces 508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 510, one or more XR displays 512, one or more optional interior- and/or exterior-facing image sensors 514, a memory 520, and one or more communication buses 504 for interconnecting these and various other components.

In some implementations, the one or more communication buses 504 include circuitry that interconnects and controls communications between system components. In some implementations, the one or more I/O devices and sensors 506 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 512 are configured to present XR content to the user. In some implementations, the one or more XR displays 512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 512 correspond to diffractive, reflective, polarized, holographic, etc. waveguide displays. For example, the electronic device 500 includes a single XR display. In another example, the electronic device 500 includes an XR display for each eye of the user. In some implementations, the one or more XR displays 512 are capable of presenting AR, MR, and/or VR content.

In various implementations, the one or more XR displays 512 are video passthrough displays which display at least a portion of a real scene as an image captured by a scene camera. In various implementations, the one or more XR displays 512 are optical see-through displays which are at least partially transparent and pass light emitted by or reflected off the real scene.

In some implementations, the one or more image sensors 514 are configured to obtain image data that corresponds to at least a portion of the face of the user that includes the eyes of the user (any may be referred to as an eye-tracking camera). In some implementations, the one or more image sensors 514 are configured to be forward-facing so as to obtain image data that corresponds to the physical environment as would be viewed by the user if the electronic device 500 was not present (and may be referred to as a scene camera). The one or more optional image sensors 514 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530 and an XR presentation module 540.

The operating system 530 includes procedures for handling various basic system services and for performing hardware dependent tasks. In some implementations, the XR presentation module 540 is configured to present XR content to the user via the one or more XR displays 512. To that end, in various implementations, the XR presentation module 540 includes a data obtaining unit 542, a node graph composing unit 544, an XR presenting unit 546, and a data transmitting unit 548.

In some implementations, the data obtaining unit 542 is configured to obtain data (e.g., presentation data, interaction data, sensor data, location data, etc.). The data may be obtained from the one or more processing units 502 or another electronic device. To that end, in various implementations, the data obtaining unit 542 includes instructions and/or logic therefor, and heuristics and metadata therefor.

In some implementations, the node graph composing unit 544 is configured to provide an interface for generating a node graph. To that end, in various implementations, the node graph composing unit 544 includes instructions and/or logic therefor, and heuristics and metadata therefor.

In some implementations, the XR presenting unit 546 is configured to present XR content via the one or more XR displays 512. To that end, in various implementations, the XR presenting unit 546 includes instructions and/or logic therefor, and heuristics and metadata therefor.

In some implementations, the data transmitting unit 548 is configured to transmit data (e.g., presentation data, location data, etc.) to the one or more processing units 502, the memory 520, or another electronic device. To that end, in various implementations, the data transmitting unit 548 includes instructions and/or logic therefor, and heuristics and metadata therefor.

Although the data obtaining unit 542, the node graph composing unit 544, the XR presenting unit 546, and the data transmitting unit 548 are shown as residing on a single electronic device 500, it should be understood that in other implementations, any combination of the data obtaining unit 542, the node graph composing unit 544, the XR presenting unit 546, and the data transmitting unit 548 may be located in separate computing devices.

Moreover, FIG. 5 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device having a display, one or more processors, and non-transitory memory:

displaying, on the display, a plurality of nodes associated with a respective plurality of operations;

displaying a node group representation including a boundary surrounding a node group including a subset of the plurality of nodes;

in response to a determination that an excluded node excluded from the node group is at a first location outside the boundary, displaying each of the subset of the plurality of nodes of the node group and the excluded node in a first manner;

moving the excluded node from the first location outside the boundary to a second location inside the boundary; and in response to a determination that the excluded node is at the second location inside the boundary, changing display of the excluded node from the first manner to a second manner different than the first manner.

2. The method of claim 1, further comprising determining the node group by:

detecting a first user input selecting the subset of the plurality of nodes; and detecting a second user input grouping the subset of the plurality of nodes.

3. The method of claim 1, wherein:

displaying the excluded node in the first manner includes displaying a border of the excluded node in the first manner; and displaying the excluded node in the second manner includes displaying a border of the excluded node in the second manner.

4. The method of claim 1, wherein:

displaying the excluded node in the first manner includes displaying an interior of the excluded node in the first manner; and displaying the excluded node in the second manner includes displaying an interior of the excluded node in the second manner.

5. The method of claim 1, wherein displaying the excluded node in the first manner includes displaying text of the excluded node in the first manner; and displaying the excluded node in the second manner includes displaying text of the excluded node in the second manner.

6. The method of claim 1, wherein:

displaying the excluded node in the first manner includes displaying the excluded node with a solid line; and displaying the excluded node in the second manner includes displaying the excluded node with a dashed line.

7. The method of claim 1, wherein:

displaying the excluded node in the first manner includes displaying the excluded node with a first color;

displaying the excluded node in the second manner includes displaying the excluded node with a second color; and the first color is different than the second color.

8. The method of claim 1, wherein:

displaying the excluded node in the first manner includes displaying the excluded node with a first line width;

displaying the excluded node in the second manner includes displaying the excluded node with a second line width; and the first line width is different than the second line width.

9. The method of claim 1, wherein:

displaying the excluded node in the first manner includes displaying the excluded node with a first transparency;

displaying the excluded node in the second manner includes displaying the excluded node with a second transparency; and the first transparency is different than the second transparency.

10. The method of claim 1, further comprising:

moving the excluded node from the second location inside the boundary to a third location outside the boundary; and in response to a determination that the excluded node is at the third location outside the boundary, changing display of the excluded node from the second manner to the first manner.

11. The method of claim 1, further comprising:

changing a location of the boundary such that the second location of the excluded node changes from being inside the boundary to outside the boundary; and in response to a determination that the excluded node is at the second location outside the boundary, changing display of the excluded node from the second manner to the first manner.

12. The method of claim 1, wherein the node group representation further includes a group name and a group descriptor.

13. The method of claim 1, wherein the node group representation further includes a group icon.

14. The method of claim 1, further comprising:

detecting user input to trigger an auto-layout function; and in response to detecting the user input, changing a relative position of the node group representation and the excluded node without changing relative positions between the subset of the plurality of nodes of the node group.

15. The method of claim 1, further comprising:

detecting user input to trigger an auto-layout function; and in response to detecting the user input, changing relative positions between the subset of the plurality of nodes of the node group without changing a relative position of the node group representation and the excluded node.

16. A device comprising:

a display;

non-transitory memory; and one or more processors to:

display, on the display, a plurality of nodes associated with a respective plurality of operations;

display a node group representation including a boundary surrounding a node group including a subset of the plurality of nodes;

in response to a determination that an excluded node excluded from the node group is at a first location outside the boundary, display each of the subset of the plurality of nodes of the node group and the excluded node in a first manner;

move the excluded node from the first location outside the boundary to a second location inside the boundary; and in response to a determination that the excluded node is at the second location inside the boundary, change display of the excluded node from the first manner to a second manner different than the first manner.

17. The device of claim 16, wherein the one or more processors are further to:

detect user input to trigger an auto-layout function; and in response to detecting the user input, change a relative position of the node group representation and the excluded node without changing relative positions between the subset of the plurality of nodes of the node group.

18. The device of claim 16, wherein the one or more processors are further to:

detecting user input to trigger an auto-layout function; and in response to detecting the user input, change relative positions between the subset of the plurality of nodes of the node group without changing a relative position of the node group representation and the excluded node.

19. A non-transitory memory storing one or more programs, which, when executed by one or more processors of a device including a display, cause the device to:

display, on the display, a plurality of nodes associated with a respective plurality of operations;

display a node group representation including a boundary surrounding a node group including a subset of the plurality of nodes;

in response to a determination that an excluded node excluded from the node group is at a first location outside the boundary, display each of the subset of the plurality of nodes of the node group and the excluded node in a first manner;

move the excluded node from the first location outside the boundary to a second location inside the boundary; and in response to a determination that the excluded node is at the second location inside the boundary, change display of the excluded node from the first manner to a second manner different than the first manner.

* * * * *